(12) United States Patent
Uchino et al.

(10) Patent No.: US 7,333,882 B2
(45) Date of Patent: Feb. 19, 2008

(54) SUSPENSION CONTROL APPARATUS

(75) Inventors: Toru Uchino, Kanagawa-ken (JP);
Nobuyuki Ichimaru, Kanagawa-ken (JP); Masaaki Uchiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 11/053,975

(22) Filed: Feb. 10, 2005

(65) Prior Publication Data
US 2005/0178628 A1    Aug. 18, 2005

(30) Foreign Application Priority Data
Feb. 12, 2004    (JP)    ............................. 2004-034494

(51) Int. Cl.
*B60G 9/00*    (2006.01)
(52) U.S. Cl. ........................ 701/37; 267/136
(58) Field of Classification Search ................. 701/36, 701/37, 38; 267/136, 140.14; 188/266.1, 188/266.2, 266.3, 378, 379, 380; 280/5.515, 280/5.519
See application file for complete search history.

(56) References Cited

U.S. PATENT DOCUMENTS

| | | | | |
|---|---|---|---|---|
| 5,586,627 A | * | 12/1996 | Nezu et al. | 188/266.6 |
| 5,598,337 A | * | 1/1997 | Butsuen et al. | 701/37 |
| 5,697,634 A | * | 12/1997 | Kamimae et al. | 280/124.108 |
| 5,828,970 A | * | 10/1998 | Kimura et al. | 701/37 |
| 5,979,885 A | * | 11/1999 | Katsuda | 267/140.14 |
| 6,366,841 B1 | * | 4/2002 | Ohsaku | 701/37 |
| 6,434,460 B1 | * | 8/2002 | Uchino et al. | 701/37 |

FOREIGN PATENT DOCUMENTS

| | | |
|---|---|---|
| JP | 2000-94921 | 4/2000 |
| JP | 2002-321513 | 11/2002 |

* cited by examiner

*Primary Examiner*—Dalena Tran
(74) *Attorney, Agent, or Firm*—Wenderoth, Lind & Ponack, L.L.P.

(57) ABSTRACT

In a suspension control system a sky-hook command signal (B) obtained from velocity data obtained by integrating a sprung mass acceleration ($\alpha u$) from a sprung mass acceleration sensor ($9u$) and an unsprung mass vibration damping command signal (C) obtained on the basis of an unsprung mass acceleration ($\alpha d$) detected by an unsprung mass acceleration sensor ($9d$) are added together to obtain a control signal (A) for a damping characteristic inverting type shock absorber (6). The control signal (A) reflects the unsprung mass acceleration ($\alpha d$) that leads in phase by 90° the piston speed. Accordingly, it is possible to compensate for a response delay due to an actuator (11), etc.

14 Claims, 26 Drawing Sheets

SUSPENSION CONTROL APPARATUS

BACKGROUND OF THE INVENTION

The present invention relates to a suspension control system having a damping characteristic inverting type shock absorber for use in vehicles such as automobiles and railway vehicles.

One example of conventional suspension control systems having a damping characteristic inverting type shock absorber is disclosed in Japanese Patent Application Unexamined Publication (KOKAI) No. 2002-321513.

The suspension control system disclosed in the above-mentioned publication operates to damp vibrations of the sprung mass (vehicle body) as follows. When the vehicle rides over an upward swelling of undulation in the road surface, for example, the suspension control system provides "soft" damping characteristics for the compression stroke, thereby suppressing the upward movement of the vehicle body as it is pushed up. Meanwhile, "hard" damping characteristics are provided for the extension stroke. Therefore, when the vehicle goes down the undulation after reaching the top of the swelling, the vehicle body that tends to move upward is pulled downward by the weight of the axle-side members of the vehicle, thereby keeping the vehicle body flat. In addition, the conventional suspension control system estimates the piston speed (relative velocity) from the vertical acceleration of the sprung mass and suppresses unsprung mass vibrations (violent vibrations of the unsprung mass) on the basis of the estimated relative velocity, thereby minimizing high-frequency noise to the occupants of the vehicle and the degradation of tire's road holding capability (and hence the degradation of steering stability during cornering), which are caused by unsprung mass vibrations (violent vibrations of the unsprung mass).

Incidentally, the above-described unsprung mass vibrations (violent vibrations of the unsprung mass) have a frequency (unsprung mass resonance frequency) in the neighborhood of about 10 to 15 Hz and are, in general, higher in frequency than vibrations occurring on the sprung mass (sprung mass resonance frequency; about 1 Hz). The above-described prior art attempts to suppress the unsprung mass vibrations but performs the control for suppressing the unsprung mass vibrations on the basis of the vertical acceleration of the sprung mass. Therefore, the prior art suffers a delay in change of the damping characteristics of the shock absorber and, in actuality, cannot perform unsprung mass vibration damping control with high accuracy. Thus, there is some room for further improvement in the suppression of unsprung mass vibrations.

The present invention was made in view of the above-described circumstances. Accordingly, an object of the present invention is to provide a suspension control system capable of improving the effectiveness of the unsprung mass vibration damping control.

SUMMARY OF THE INVENTION

The present invention provides a suspension control system including a damping characteristic inverting type shock absorber provided between a sprung mass member and an unsprung mass member of a vehicle. The shock absorber is arranged such that when damping characteristics for one of the extension and compression strokes are "soft" damping characteristics, damping characteristics for the other stroke are adjusted between "soft" and "hard" damping characteristics, whereas when the damping characteristics for the other stroke are "soft" damping characteristics, the damping characteristics for the one stroke are adjusted between "soft" and "hard" damping characteristics. A sprung mass vertical acceleration detecting device detects the vertical acceleration of the sprung mass member. An unsprung mass vertical acceleration detecting device detects the vertical acceleration of the unsprung mass member. A controller controls the damping characteristics of the shock absorber according to detected signals from the sprung mass vertical acceleration detecting device and the unsprung mass vertical acceleration detecting device.

In one embodiment of the present invention, the controller calculates the relative acceleration of the damping characteristic inverting type shock absorber from the detected signals from the sprung mass vertical acceleration detecting device and the unsprung mass vertical acceleration detecting device, and controls the damping characteristics of the shock absorber in accordance with the magnitude of the relative acceleration.

In one embodiment of the present invention, a filter that passes a frequency signal in the neighborhood of the unsprung mass resonance frequency is provided at a stage subsequent to the sprung mass vertical acceleration detecting device or the unsprung mass vertical acceleration detecting device.

In one embodiment of the present invention, the cut-off frequency of the filter is changed in accordance with the weight of the unsprung mass member and the spring constant.

In one embodiment of the present invention, the controller is provided with a road surface condition judging device, and a control parameter for a control signal applied to the damping characteristic inverting type shock absorber based on the detected signal from the unsprung mass vertical acceleration detecting device is varied according to the result of judgment by the road surface condition judging device.

In one embodiment of the present invention, the judgment by the road surface condition judging device is made on the basis of a detected signal from a sprung mass vertical acceleration detecting device provided for the front wheel side of the vehicle.

In one embodiment of the present invention, the damping characteristics of a damping characteristic inverting type shock absorber provided for the rear wheel side of the vehicle are varied according to a detected signal from an unsprung mass vertical acceleration detecting device provided for the front wheel side of the vehicle.

According to the present invention, the damping characteristics of the damping characteristic inverting type shock absorber are controlled on the basis of a signal containing the contents of a detected signal from the unsprung mass vertical acceleration detecting device that leads in phase by 90° the vertical velocity of the unsprung mass member. Therefore, it is possible to compensate for the delay of the signal and to perform suspension control ahead of time. Hence, the effectiveness of unsprung mass vibration damping control can be improved.

The present invention will be described below more specifically with reference to the accompanying drawings.

DETAILED DESCRIPTION OF THE INVENTION

Figure 1:
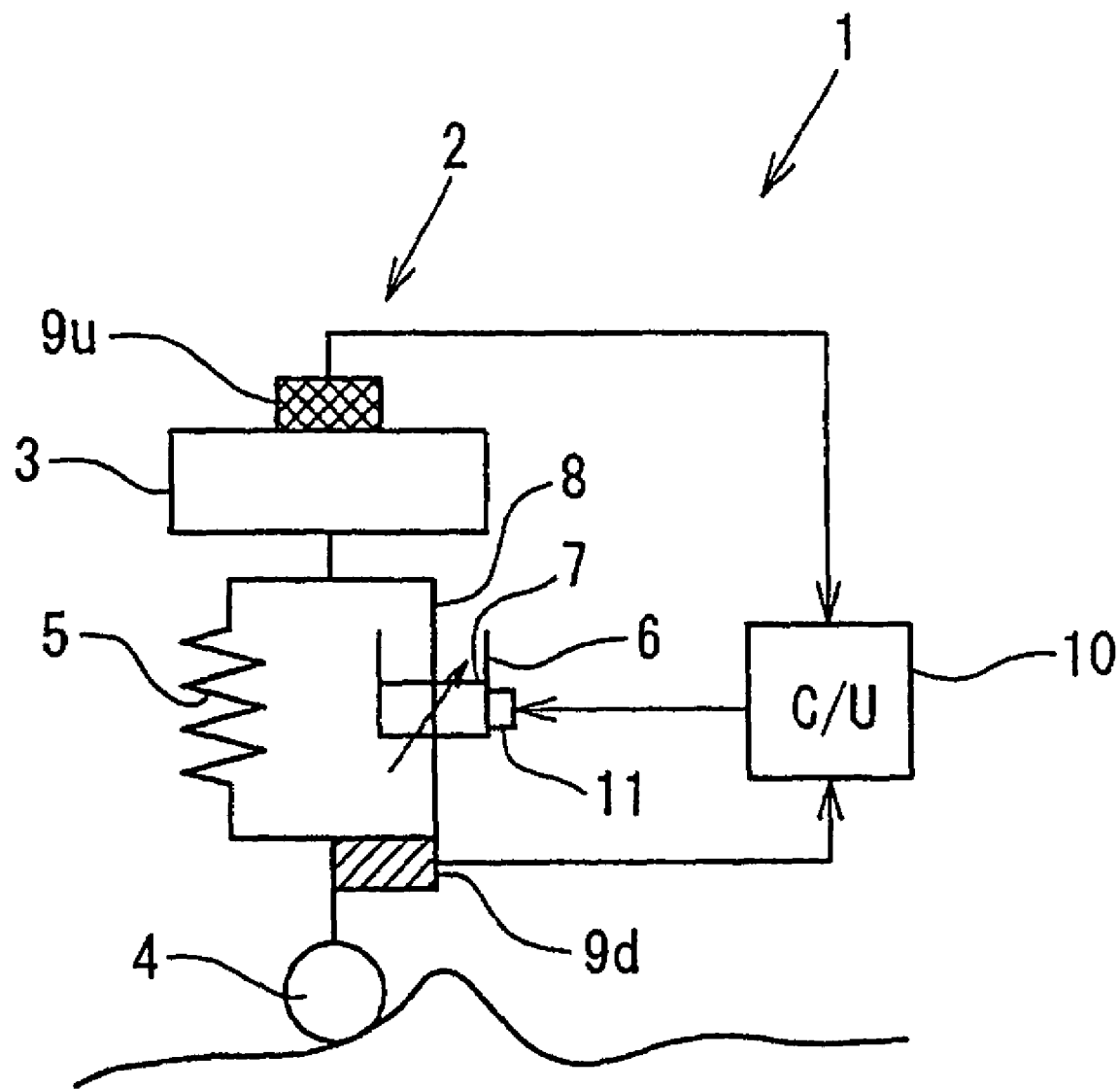
FIG. 1 is a diagram schematically showing a suspension control system according to a first embodiment of the present invention.

A suspension control system 1 according to a first embodiment of the present invention will be described below with reference to FIGS. 1 to 4. In FIG. 1, a spring 5 and a damping characteristic adjustable shock absorber 6 (damping characteristic inverting type shock absorber) are interposed in parallel between a vehicle body 3 (sprung mass member) and each of four wheel(4)-side structures (only one of them is shown in the figure), which constitute an automobile 2 (vehicle). The wheel(4)-side structure is an unsprung mass member (hereinafter occasionally referred to as simply "unsprung mass") including a shock absorber mounting bracket on an axle, etc. The spring 5 and the shock absorber 6 support the vehicle body 3. The shock absorber 6 has a piston 7 movably accommodated therein. A piston rod 8 connected to the piston 7 is held by the vehicle body 3. The shock absorber 6 is held by a wheel(4)-side structure (including a shock absorber mounting bracket, etc.).

A sprung mass acceleration sensor 9u (sprung mass vertical acceleration detecting device) is mounted on the vehicle body 3 to detect the vertical acceleration (sprung mass vertical acceleration; hereinafter referred to as "sprung mass acceleration" for the sake of convenience) αu of the vehicle body 3 relative to an absolute coordinate system. An unsprung mass acceleration sensor 9d (unsprung mass vertical acceleration detecting device) is mounted on the wheel (4)-side structure to detect the vertical acceleration (unsprung mass vertical acceleration; hereinafter referred to as "unsprung mass acceleration" for the sake of convenience) αd of the wheel(4)-side structure relative to an absolute coordinate system.

The sprung mass acceleration αu (detected signal) detected with the sprung mass acceleration sensor 9u and the unsprung mass acceleration αd (detected signal) detected with the unsprung mass acceleration sensor 9d are supplied to a controller 10 (control unit).

It should be noted that a total of four combinations of springs 5 and shock absorbers 6 are provided in correspondence to the four wheels 4, respectively; however, only one combination is shown in the figure for the sake of convenience. It should further be noted that the automobile 2 has one or two combinations of sprung and unsprung mass acceleration sensors 9$u$ and 9$d$ for the front wheel side and at least one combination of sprung and unsprung mass acceleration sensors 9$u$ and 9$d$ for the rear wheel side; however, FIG. 1 shows only one combination of sprung and unsprung mass acceleration sensors 9$u$ and 9$d$ for the sake of convenience. An actuator 11 operates in response to a control signal A (described later) input thereto and causes the shock absorber 6 to generate damping force (desired damping force) according to the control signal A.

Figure 3:
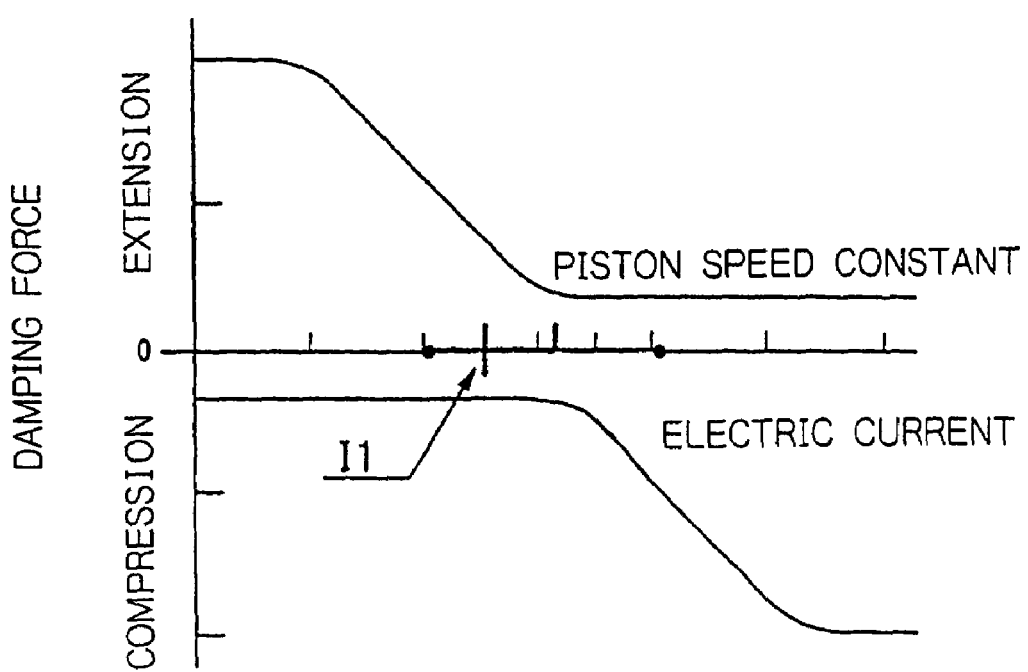
FIG. 3 is a diagram showing current-to-damping force characteristics of a shock absorber used in the suspension control system of FIG. 1.

The shock absorber 6 is arranged to operate as shown in FIG. 3. When the compression damping characteristics are "soft", the extension damping characteristics are adjusted between "hard" and "soft" damping characteristics, whereas when the extension damping characteristics are "soft", the compression damping characteristics are adjusted between "soft" and "hard" damping characteristics. Thus, the compression damping characteristics and the extension damping characteristics are in inverse relation to each other [i.e. extension "hard" to compression "soft" (H/S) characteristics, or extension "soft" to compression "hard" (S/H) characteristics]. The sprung mass acceleration sensor 9$u$, the unsprung mass acceleration sensor 9$d$ and the actuator 11 are connected with the controller 10.

The controller 10 has a sky-hook control computing section 12 (sprung mass vibration damping signal computing section), an unsprung mass vibration damping control computing section 13 (unsprung mass vibration damping signal computing section), and a control signal output section 14. The sky-hook control computing section 12 is supplied as an input with the sprung mass acceleration $\alpha u$ of the vehicle body 3 detected with the sprung mass acceleration sensor 9$u$ to generate a sky-hook command signal B and outputs it. The unsprung mass vibration damping control computing section 13 is supplied as an input with the unsprung mass acceleration $\alpha d$ detected with the unsprung mass acceleration sensor 9$d$ to generate an unsprung mass vibration damping command signal C and outputs it. The control signal output section 14 generates a control signal A (and hence a desired damping force) on the basis of the sky-hook command signal B and the unsprung mass vibration damping command signal C and outputs the control signal A to the actuator 11 to adjust damping force to be generated from the shock absorber 6.

More specifically, the control signal output section 14 (desired damping characteristic control signal computing section) adds together the sky-hook command signal B and the unsprung mass vibration damping command signal C to generate a control signal A. The control signal A is output to the actuator 11, which causes the shock absorber 6 to generate damping force according to the control signal A.

Figure 2:
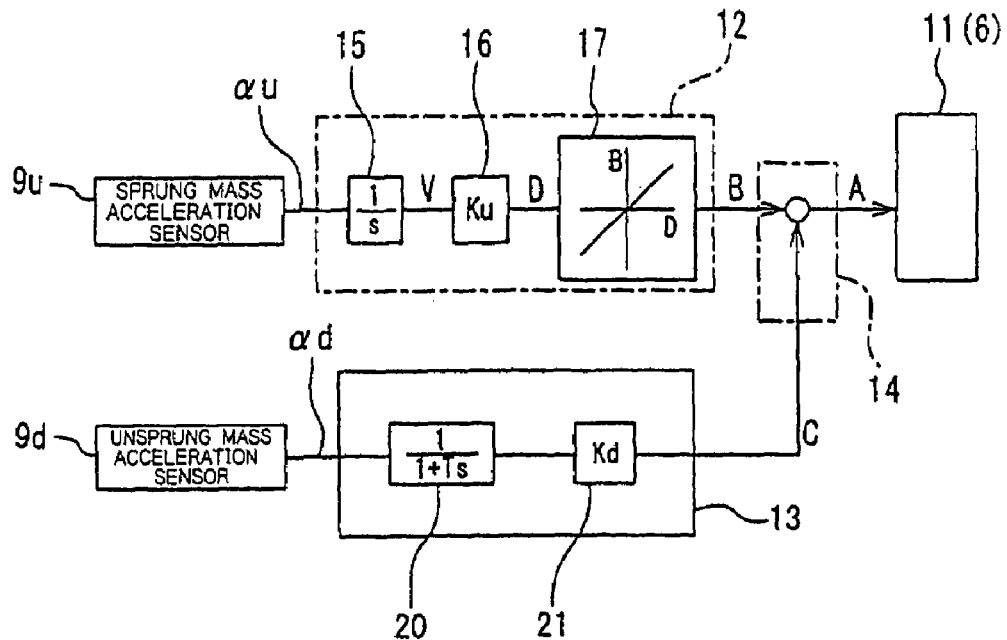
FIG. 2 is a block diagram schematically showing a controller used in the suspension control system of FIG. 1.

As shown in FIG. 2, the sky-hook control computing section 12 has an integrator circuit 15, an amplifier circuit 16, and a sky-hook command signal output section 17. The integrator circuit 15 integrates the sprung mass acceleration $\alpha u$ from the sprung mass acceleration sensor 9$u$ to obtain a vertical velocity (absolute velocity) V. The amplifier circuit 16 multiplies the velocity V by a control gain Ku of a predetermined magnitude to obtain a signal D. The sky-hook command signal output section 17 obtains a sky-hook command signal B with a magnitude corresponding to the signal D obtained from the amplifier circuit 16 and outputs the sky-hook command signal B to the control signal output section 14.

Figure 6:
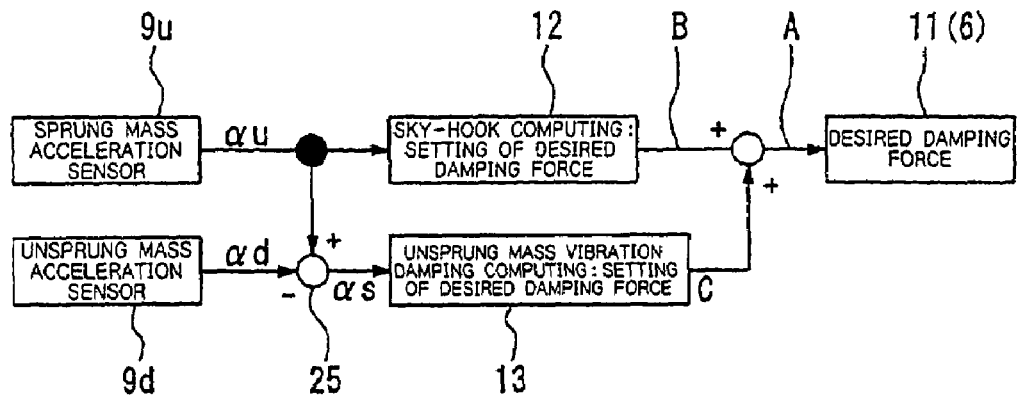
FIG. 6 is a block diagram showing still another example (using a relative acceleration) of the control signal output section shown in FIG. 2.

The unsprung mass vibration damping control computing section 13 comprises, as shown in FIGS. 2 and 6, a low-pass filter 20 (cut-off frequency: 11 Hz) and an amplifier circuit 21. The low-pass filter 20 is supplied as an input with the unsprung mass acceleration $\alpha d$ detected with the unsprung mass acceleration sensor 9$d$ and passes frequency components not higher than 11 Hz [this pass band includes frequencies in the neighborhood of the sprung mass resonance frequency (1 Hz) and frequencies (unsprung mass violent vibrations) in the neighborhood of the unsprung mass resonance frequency (10 to 11 Hz)]. The amplifier circuit 21 amplifies a signal of low-frequency component passed through the low-pass filter 20 by multiplying it by a control gain Kd to obtain an unsprung mass vibration damping command signal C, and outputs it to the control signal output section 14.

Although the cut-off frequency is set at 11 Hz in the above, it should be noted that the value of the cut-off frequency may be set differently for each individual vehicle.

In the first embodiment, high-frequency components (frequencies higher than the unsprung mass resonance frequency, e.g. frequencies exceeding 11 Hz) related to noise are removed through the low-pass filter 20 from the unsprung mass acceleration $\alpha d$ detected with the unsprung mass acceleration sensor 9$d$, whereby an unsprung mass vibration damping command signal C is generated and input to the control signal output section 14. The control signal output section 14 adds together the unsprung mass vibration damping command signal C and the sky-hook command signal B after converting them into a form that can be subjected to an addition operation, thereby obtaining a control signal A, and outputs it to the actuator 11. The actuator 11 causes the shock absorber 6 to generate damping force according to the control signal A.

The control signal A reflects the unsprung mass acceleration $\alpha d$ and leads in phase the velocity signal. Accordingly, unsprung mass vibrations can be damped with favorable response. In other words, the unsprung mass vibration damping control effect can be improved.

Figure 4:
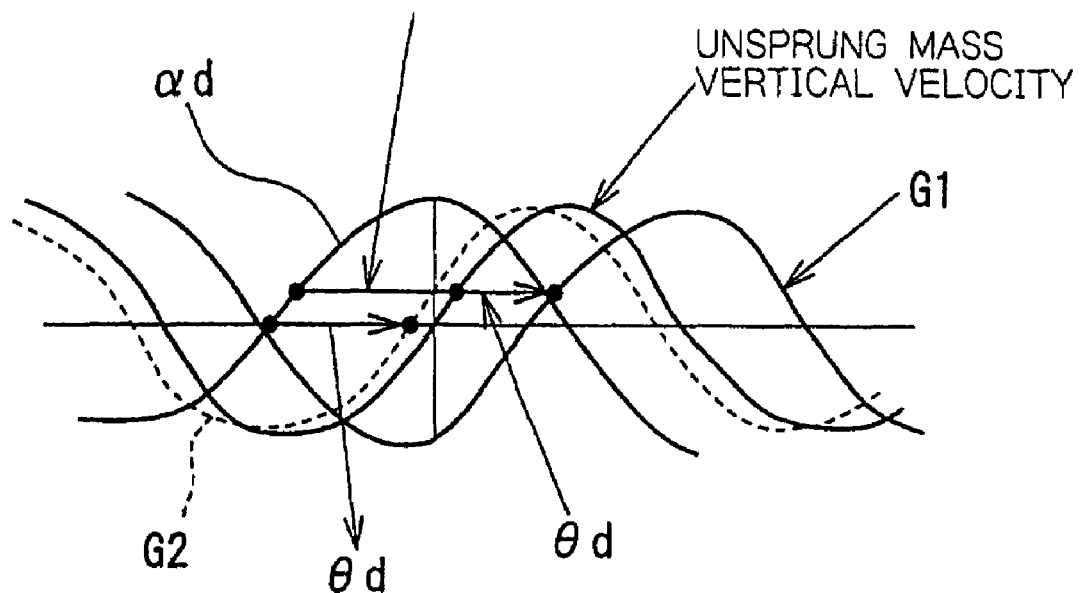
FIG. 4 is a waveform chart schematically showing the principle of the system of FIG. 1.

More specifically, this embodiment is arranged to damp unsprung mass vibrations by the operation of the shock absorber 6. Because the shock absorber 6 is of the damping characteristic inverting type, it is necessary to switch between damping characteristics (switching between H/S and S/H) for each stroke. In addition, the actuator 11 involves a delay in response (hereinafter referred to as "operation delay $\theta d$"). Therefore, if an unsprung mass vertical velocity obtained by integrating the unsprung mass acceleration $\alpha d$ is used for the control of the shock absorber 6, as shown in FIG. 4, actually obtainable damping force (hereinafter referred to as "vertical velocity-based damping force") G1 is generated with a delay corresponding to the operation delay $\theta d$. This causes degradation of the unsprung mass vibration damping control effect (i.e. accurate control is suppressed). Under these circumstances, the inventors of this application provided a simulated apparatus in conformity to this embodiment and measured the operation delay $\theta d$ of the actuator on the simulated apparatus. We obtained a value of about 73° as an operation delay $\theta d$ of damping force actually generated.

In contrast to the above, the unsprung mass acceleration $\alpha d$ leads (advances) in phase by 90° the speed (velocity) of the piston 7. Utilizing this fact, this embodiment employs the unsprung mass acceleration αd for the control of the shock absorber 6.

The unsprung mass acceleration αd leads in phase by 90° the speed (velocity) of the piston 7 and hence the unsprung mass vertical velocity obtained by integrating the unsprung mass acceleration αd. Therefore, when the unsprung mass acceleration αd is used for the control of the shock absorber 6, damping force (hereinafter referred to as "vertical acceleration-based damping force") G2 is generated with a delay corresponding to the operation delay θd with respect to the unsprung mass acceleration αd. However, the phase difference (hereinafter referred to as "relative-to-piston phase difference") θp with respect to the speed (velocity) of the piston 7 (unsprung mass vertical velocity) is reduced to a value determined by the subtraction of the operation delay θd from the phase lead of 90° (i.e. 90°-θd). Accordingly, the relative-to-piston phase difference θp becomes extremely small, and the control effect can be improved correspondingly. For example, when the above-described damping force generation delay θd is 73°, the relative-to-piston phase difference θp is 17°, which is very small. It should be noted that the phase difference θp varies according to the actuator responsivity and other characteristics. In this case, however, the phase difference can be minimized by providing a phase adjusting filter and adjusting the time constant thereof.

In this embodiment, the control signal A is formed to include (reflect) the unsprung mass vibration damping command signal C obtained from the unsprung mass acceleration αd. Thus, the control signal A reflects the unsprung mass acceleration αd. Therefore, the suspension control system 1 according to this embodiment allows the relative-to-piston phase difference θp to become extremely small and enables the unsprung mass vibration damping control effect to improve correspondingly, as described above with reference to FIG. 4. Consequently, unsprung mass resonant vibrations can be damped accurately, and it is possible to improve ride quality and steering stability of the vehicle.

Further, in this embodiment, the low-pass filter 20 removes frequency components exceeding 11 Hz to prevent the actuator 11 and hence the shock absorber 6 from being undesirably controlled by noise or the like. Therefore, rationalized control can be effected, and the durability of the actuator 11 can be improved.

Figure 5:
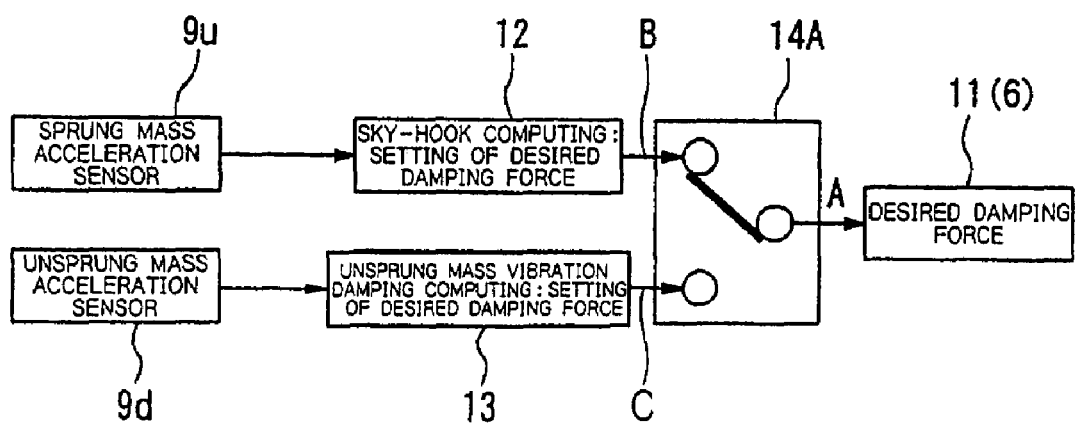
FIG. 5 is a block diagram showing another example (using a command signal switching scheme) of a control signal output section shown in FIG. 2.

In the first embodiment, the control signal output section 14 adds together the sky-hook command signal B and the unsprung mass vibration damping command signal C to generate the control signal A. The control signal output section 14 may be replaced with a control signal output section 14A as shown in FIG. 5. The control signal output section 14A selects either the sky-hook command signal B or the unsprung mass vibration damping command signal C by switching between them according to the condition of the vehicle, and uses the selected signal as a control signal A.

As shown in FIG. 6, a relative acceleration calculating section 25 may be provided between the unsprung mass acceleration αd and the unsprung mass vibration damping control computing section 13 to obtain a relative acceleration as by subtracting the unsprung mass acceleration αd from the sprung mass acceleration αu. In this case, the unsprung mass vibration damping control computing section 13 uses the relative acceleration as in place of the unsprung mass acceleration αd, which is used in the first embodiment, to output an unsprung mass vibration damping command signal C.

Figure 7:
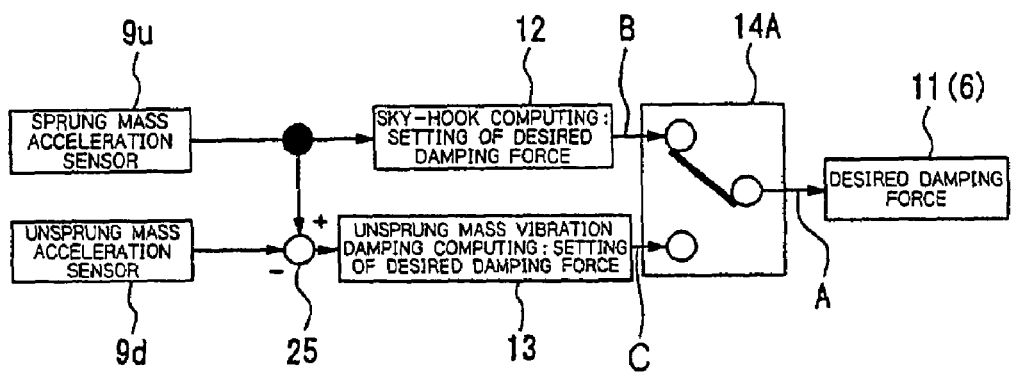
FIG. 7 is a block diagram showing a further example (using a relative acceleration and a command signal switching scheme) of the control signal output section shown in FIG. 2.

As shown in FIG. 7, the relative acceleration calculating section 25 may be used in combination with the control signal output section 14A shown in FIG. 5.

Figure 8:
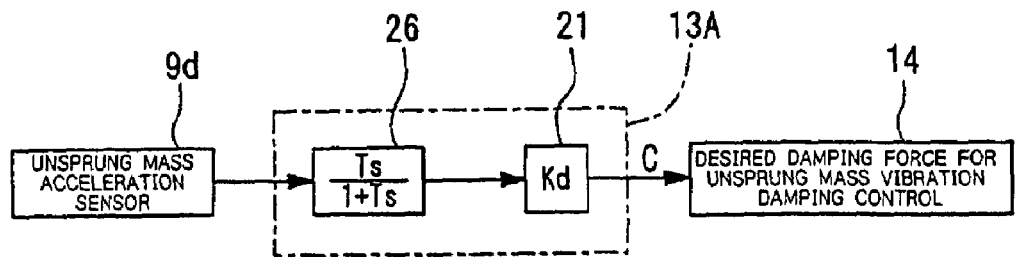
FIG. 8 is a block diagram showing another example (using a high-pass filter) of an unsprung mass vibration damping control computing section shown in FIG. 2.
Figure 9:
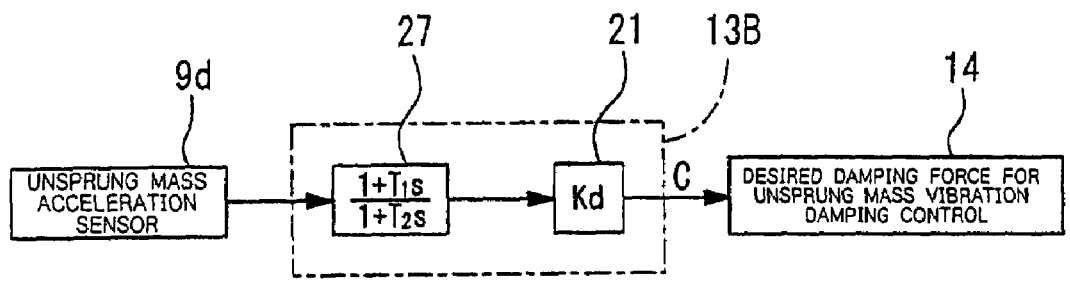
FIG. 9 is a block diagram showing still another example (using a phase lead-lag adjusting element) of the unsprung mass vibration damping control computing section shown in FIG. 2.
Figure 10:
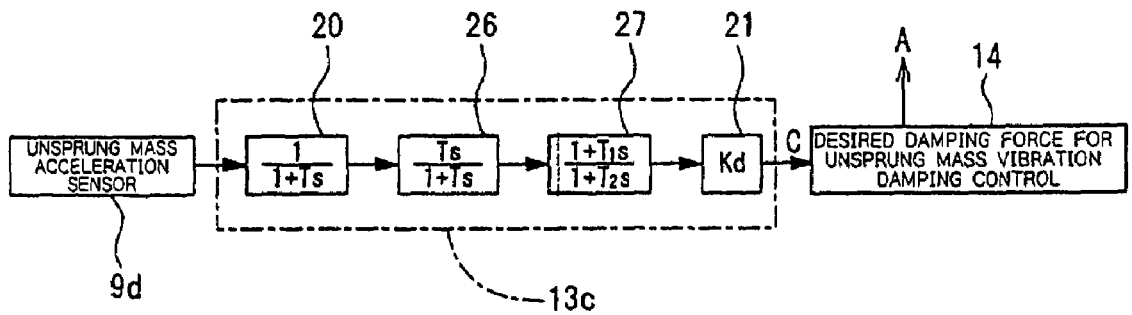
FIG. 10 is a block diagram showing a further example (using a low-pass filter, a high-pass filter, and a phase lead-lag adjusting element) of the unsprung mass vibration damping control computing section shown in FIG. 2.

The unsprung mass vibration damping control computing section 13 may be replaced with any of the following alternatives: an unsprung mass vibration damping control computing section 13A as shown in FIG. 8, an unsprung mass vibration damping control computing section 13B as shown in FIG. 9, and an unsprung mass vibration damping control computing section 13C as shown in FIG. 10.

The unsprung mass vibration damping control computing section 13A, as shown in FIG. 8, differs from the unsprung mass vibration damping control computing section 13 of FIG. 2 in that a high-pass filter 26 that passes high-frequency components in the range of 10 to 15 Hz is provided in place of the low-pass filter 20 shown in FIG. 2.

According to this example, signal components in the neighborhood of the sprung mass resonance frequency (1 Hz) are removed. Therefore, it becomes possible to make an adjustment so that the actuator 11 and hence the shock absorber 6 will not be controlled by a signal component in the neighborhood of the sprung mass resonance frequency, and hence possible to suppress the degradation of the sky-hook control effect.

The unsprung mass vibration damping control computing section 13B is, as shown in FIG. 9, provided with a phase lead-lag adjusting element 27 in place of the low-pass filter 20 in FIG. 2 to make a phase lead-lag adjustment so that the unsprung mass acceleration αd and the relative acceleration as are close in phase to the relative velocity. According to this example, the phase lead-lag adjusting element 27 can solve the above-described problem of phase lag, and rationalized control can be effected.

The unsprung mass vibration damping control computing section 13C, as shown in FIG. 10, has a high-pass filter 26 as shown in FIG. 8 and a phase lead-lag adjusting element 27 as shown in FIG. 9, which are provided at a stage subsequent to the low-pass filter 20. According to this example, the combination of the low-pass filter 20, the high-pass filter 26 and the phase lead-lag adjusting element 27 can simultaneously adjust the gain Kd and phase of a frequency component (e.g. 10 to 15 Hz) desired to be controlled to obtain an optimal control signal A. Thus, the unsprung mass vibration damping control computing section 13C can reduce unsprung mass resonant vibrations preferentially. Combined control by the sky-hook control computing section 12 and the unsprung mass vibration damping control computing section 13C makes it possible to simultaneously reduce sprung mass resonant vibrations and unsprung mass resonant vibrations.

Figure 11:
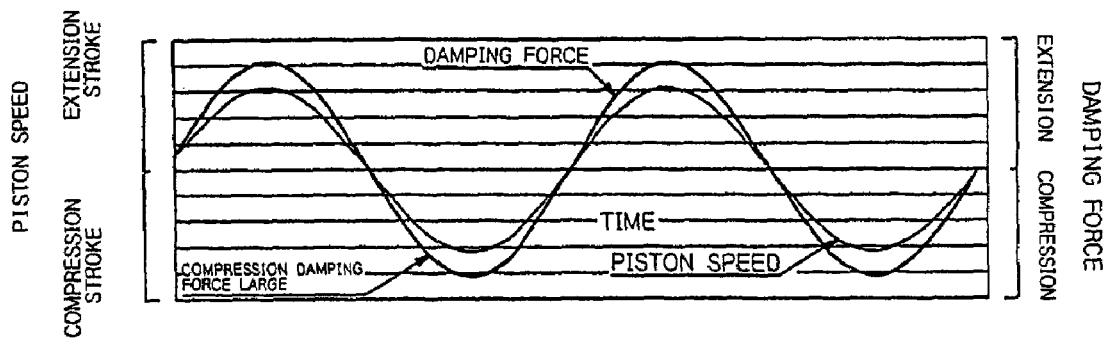
FIG. 11 is a characteristic chart showing damping force obtained by the suspension control system of FIG. 1.
Figure 12:
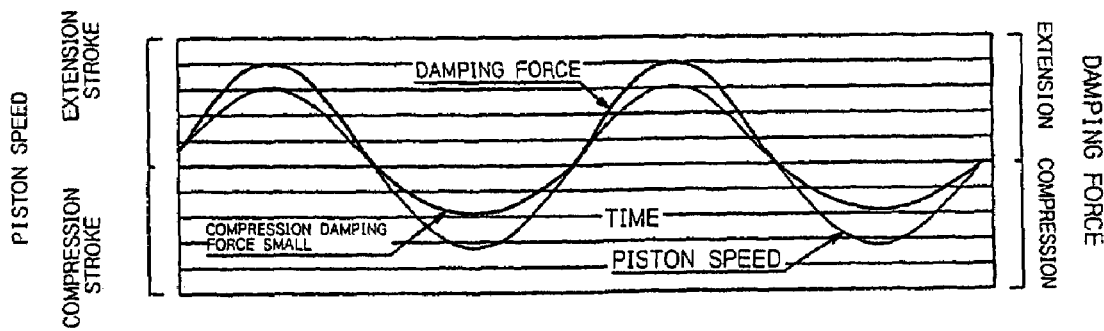
FIG. 12 is a characteristic chart showing damping force obtained by a conventional system in comparison with FIG. 11.

In conventional practice, when unsprung mass vibrations are violent, vibration damping control is effected simply by fixing the electric current value at I1 in the current-to-damping force characteristics in FIG. 3 at which the extension damping force is large to a certain extent, and the compression damping force is small. Therefore, damping force generated during the compression stroke is small as shown in FIG. 12. In contrast, the control system in this embodiment changes the electric current value according to the signal from the unsprung mass acceleration sensor 9d. Therefore, damping force generated during both the extension and compression strokes can be increased as shown in FIG. 11. Accordingly, it becomes possible to damp the unsprung mass vibrations effectively.

Next, a suspension control system 1A according to a second embodiment of the present invention will be described with reference to FIGS. 13 to 19. It should be noted that members equivalent to those shown in FIGS. 1 to 12 are denoted by the same reference symbols used in FIGS. 1 to 12, and a description thereof is omitted.

Figure 13:
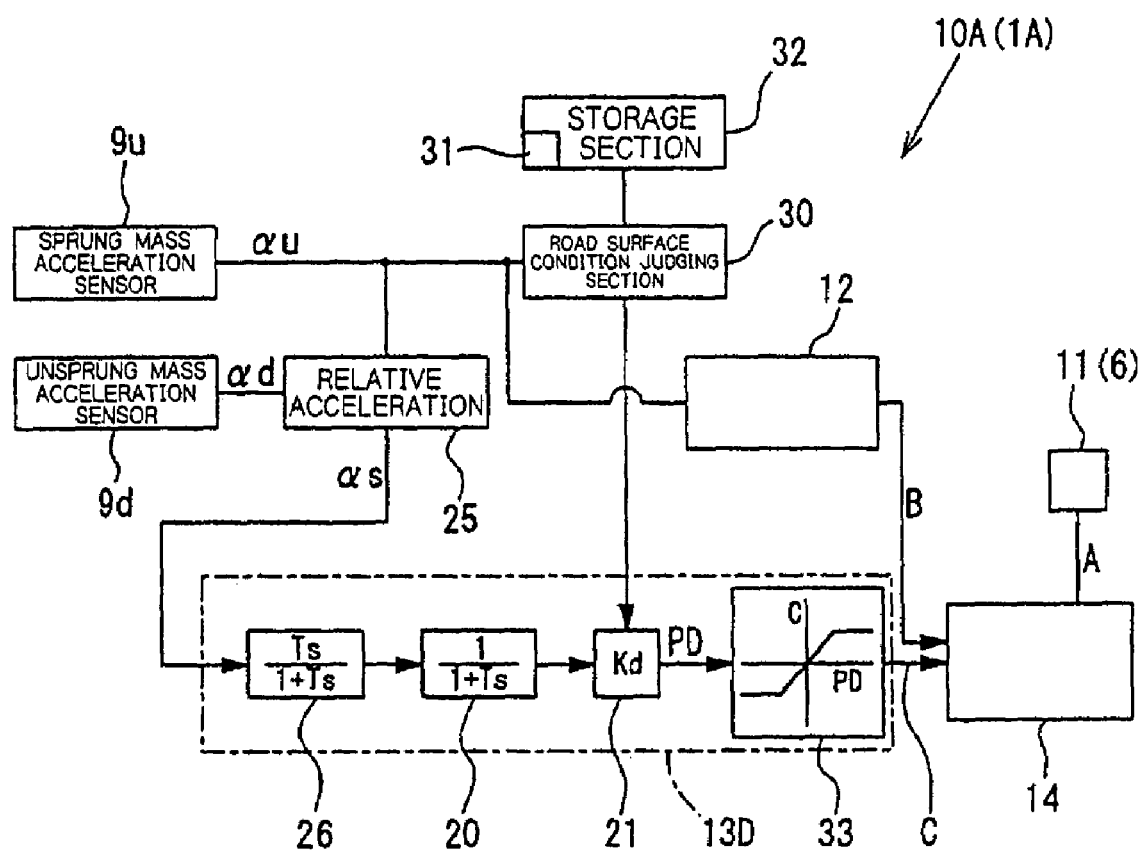
FIG. 13 is a block diagram showing a controller of a suspension control system according to a second embodiment of the present invention.

The controller 10A of the second embodiment has, as shown in FIG. 13, a relative acceleration calculating section 25, a road surface condition judging section 30, and a road surface condition judging map storage section 32. The road surface condition judging section 30 detects a road surface condition ("undulating road", "ordinary road", or "rough road") on the basis of the sprung mass acceleration αu. The storage section 32 previously stores a road surface condition judging map 31 that the judging section 30 uses to judge a road surface condition. The road surface condition judging section 30 adjusts the magnitude of the control gain Kd of the amplifier circuit 21 to correct the unsprung mass vibration damping signal.

The unsprung mass vibration damping control computing section 13D has a low-pass filter 20, a high-pass filter 26, and an amplifier circuit 21. The unsprung mass vibration damping control computing section 13D further has an unsprung mass vibration damping command signal output section 33 that performs conversion processing on the output signal from the amplifier circuit 21 to obtain an unsprung mass vibration damping command signal C.

The controller 10A has a sky-hook control computing section 12 and a control signal output section 14 in the same way as the controller 10 shown in FIG. 2. The control signal output section 14 adds together the sky-hook command signal B and the unsprung mass vibration damping command signal C from the unsprung mass vibration damping command signal output section 33 to generate a control signal A and outputs it to the actuator 11. It should be noted that the controller 10A may be arranged without the sky-hook control computing section 12 and the control signal output section 14 [i.e. suspension control is performed by using only the signal output from the unsprung mass vibration damping control computing section 13D; see the unsprung mass suspension control system (ii) in FIG. 17].

Figure 14:
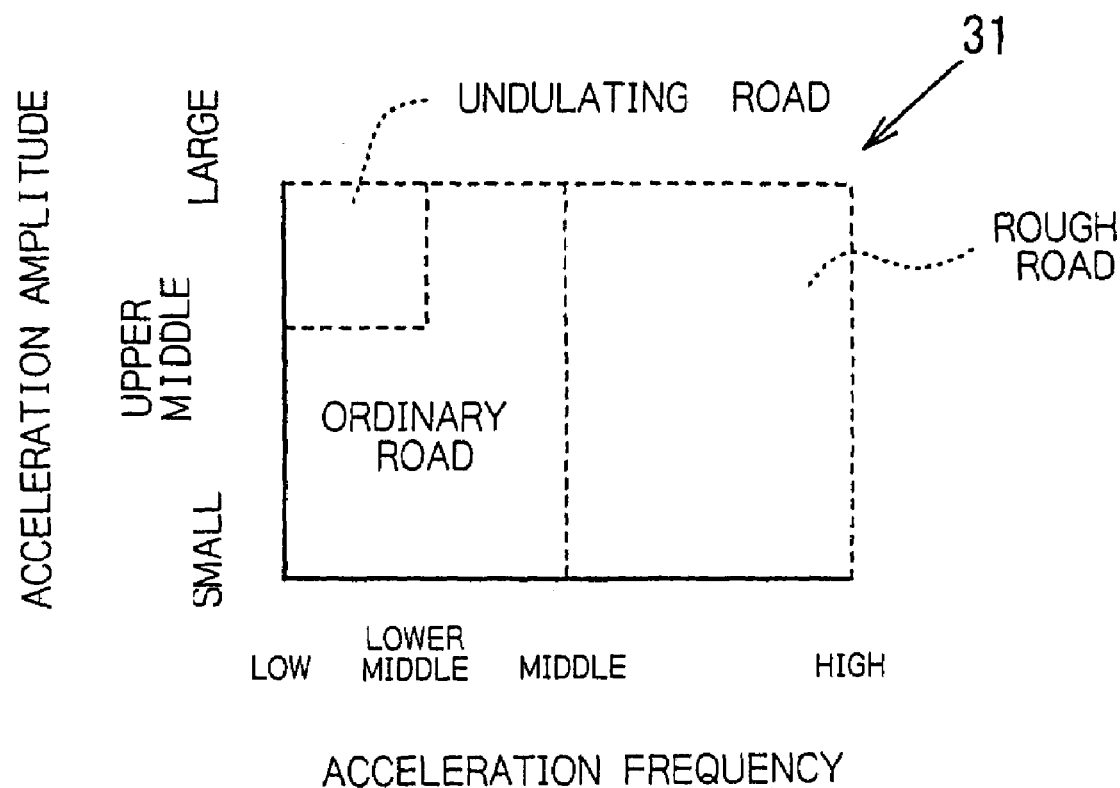
FIG. 14 is a diagram showing a road surface condition judging map stored in a storage section shown in FIG. 13.

The road surface condition judging map 31 in the storage section 32 is configured as shown in FIG. 14. A road is defined as a "rough road" when the acceleration frequency is in the range of "middle" to "high". A road is defined as an "undulating road" when the acceleration frequency is in the range of "low" to "lower middle" and the acceleration amplitude is in the range of "upper middle" to "large". A road is defined as an "ordinary road" when the acceleration frequency is in the range of "low" to "middle", excluding the region indicating "undulating road". In this embodiment, the road surface condition of a road on which the vehicle is running is estimated to be "ordinary road", "undulating road", or "rough road" on the basis of the sprung mass acceleration au from the sprung mass acceleration sensor 9u and the road surface condition judging map 31 shown in FIG. 14, and adjusts the magnitude of the gain Kd of the amplifier circuit 21 according to the estimated road surface condition.

Figure 15:
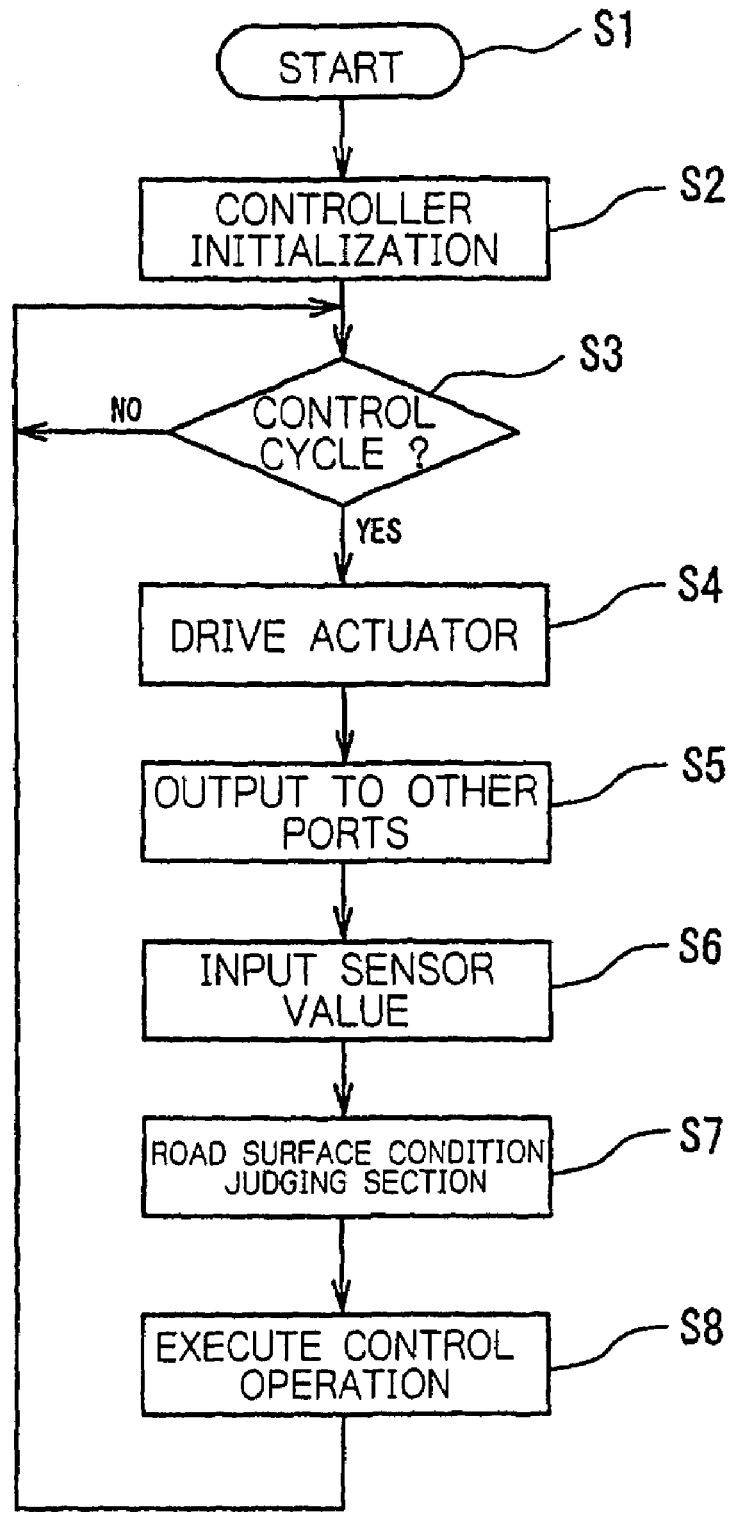
FIG. 15 is a flowchart (main routine) showing the contents of control executed by the controller shown in FIG. 13.

The controller 10A having the above-described arrangement operates as shown in FIG. 15. When supplied with electric power upon starting the engine of the vehicle (step S1), the controller 10A first executes initialization (step S2) and then judges whether or not the control cycle has been reached (step S3). Step S3 is repeated until it is judged that the control cycle has been reached.

If it is judged at step S3 that the control cycle has been reached, the controller 10A outputs the contents of the operation executed in the previous control cycle to the actuator 11 to drive it (step S4). Subsequently, the controller 10A outputs signals associated with other ports, e.g. LED (step S5). Subsequently, the controller 10A reads detected signals from the sprung and unsprung mass acceleration sensors 9u and 9d, etc. at step S6. Next, the controller 10A inputs the detected signal from the sprung mass acceleration sensor 9u to the road surface condition judging section 30 to judge the road surface condition (step S7). Further, the controller 10A executes a control operation (step S8) on the basis of the information read at step S6.

Figure 16:
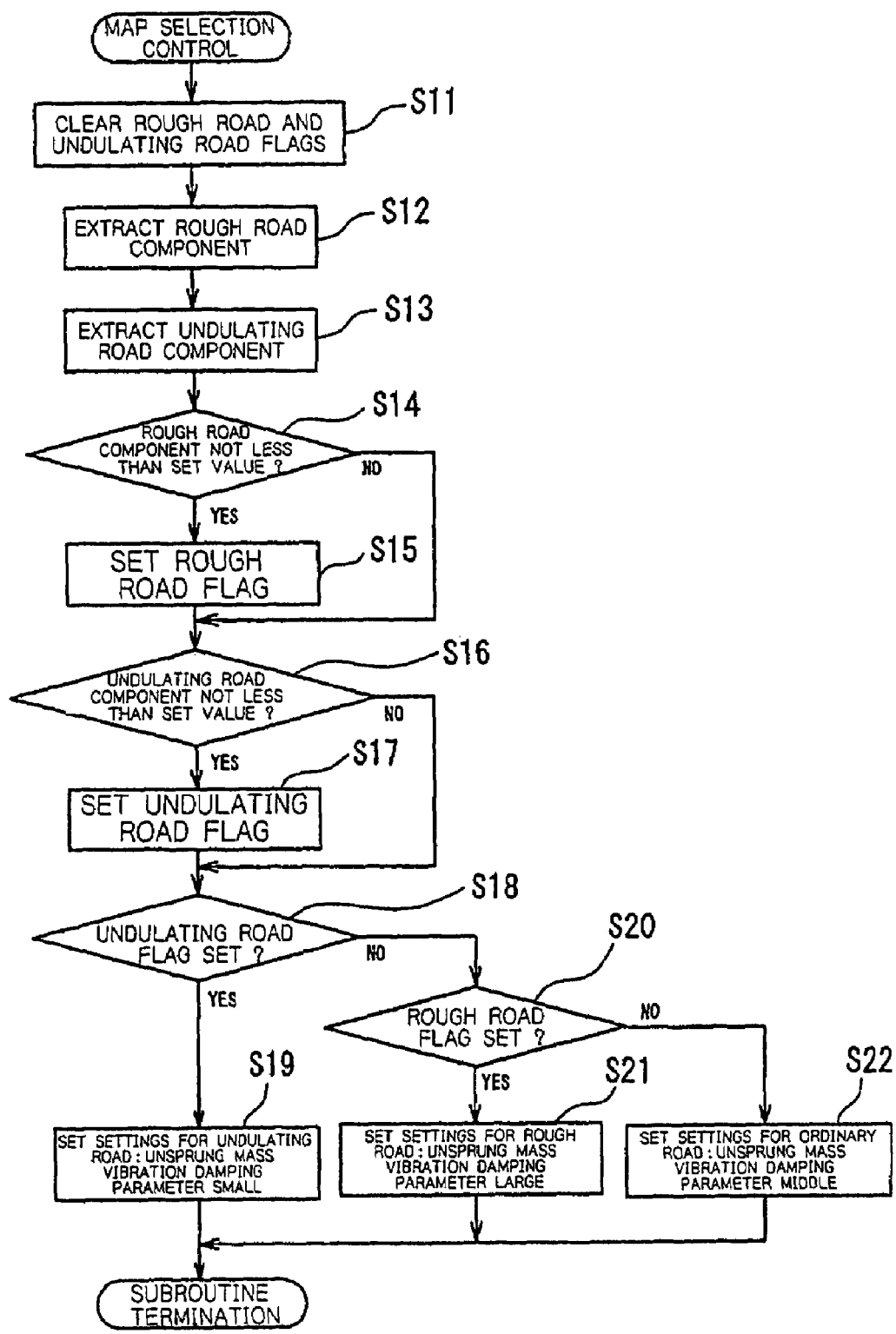
FIG. 16 is a flowchart showing the contents of processing executed by a road surface condition judging section shown in FIG. 15.
Figure 17:
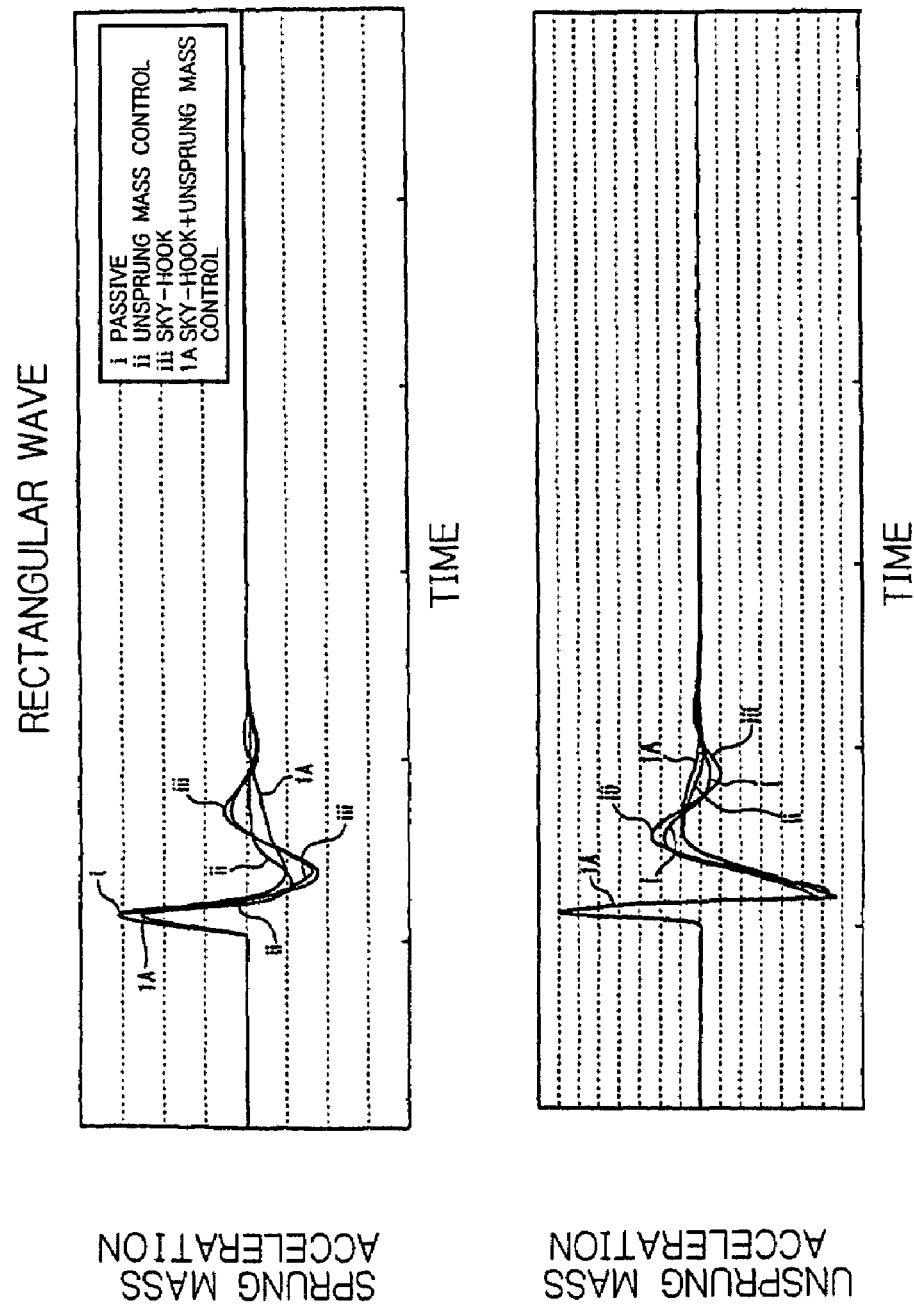
FIG. 17 is a waveform chart showing sprung and unsprung mass accelerations during running on a bumpy road that are measured for the suspension control system (FIG. 13) according to the second embodiment and suspension control systems prepared for comparison therewith.

In the road surface condition judging operation at step S7, the controller 10A executes map selection control as shown in FIG. 16.

In the map selection control shown in FIG. 16, first, the controller 10A clears a rough road flag and an undulating road flag (step S11). Subsequently, the controller 10A extracts a rough road component (frequency and amplitude) and an undulating road component (frequency and amplitude) successively (steps S12 and S13) from the detected signal from the sprung mass acceleration sensor 9u input at step S6.

Subsequently, the controller 10A judges at step S14 whether or not the rough road component (frequency and amplitude) is within the region indicating "rough road", which is shown in FIG. 14.

If YES is the answer at step S14 (i.e. the rough road component is within the "rough road" region), the controller 10A sets a rough road flag (step S15).

Upon completion of the processing at step S15, or if NO is the answer at step S14, the controller 10A judges (step S16) whether or not the undulating road component (frequency and amplitude) is within the region indicating "undulating road", which is shown in FIG. 14.

If YES is the answer at step S16 (i.e. the undulating road component is within the "undulating road" region), the controller 10A sets an undulating road flag (step S17).

Upon completion of the processing at step S17, or if NO is the answer at step S16, the controller 10A judges whether or not the undulating road flag has been set (step S18). If YES is the answer at step S18, the controller 10A sets settings for undulating road at step S19 to adjust the control gain Kd (unsprung mass vibration damping parameter) to a small value.

If NO is the answer at step S18, the controller 10A judges whether or not the rough road flag has been set (step S20). If YES is the answer at step S20, the controller 10A sets settings for rough road to adjust the control gain Kd (unsprung mass vibration damping parameter) to a large value (step S21). If NO is the answer at step S20, the controller 10A sets settings for ordinary road to adjust the control gain Kd (unsprung mass vibration damping parameter) to a middle value between those for undulating and rough roads (step S22).

As has been stated above, the road surface condition and hence the vehicle body condition is estimated on the basis of detected data from the sprung mass acceleration sensor 9u, and the control gain Kd is predetermined according to the road surface condition ("ordinary road", "undulating road", or "rough road"). Therefore, a favorable sprung and unsprung mass vibration damping effect can be obtained according to the road surface condition.

Although in the foregoing embodiment the road surface condition is estimated by using the value of the sprung mass acceleration sensor 9u, it should be noted that the present invention is not necessarily limited thereto. The road surface condition may be estimated from the frequency characteristics of the unsprung mass acceleration sensor 9d.

The inventors of this application measured the waveforms of the sprung mass acceleration $\alpha u$ and the unsprung mass acceleration $\alpha d$ during running on a bumpy road for the following four suspension control systems: the suspension control system 1A of the second embodiment (having the controller 10 shown in FIG. 13); a suspension control system constructed by using only the sky-hook control computing section 12 (see FIG. 2) [referred to as "sky-hook suspension control system" for the sake of convenience; (iii) in FIG. 17]; a suspension control system constructed in the same way as the suspension control system 1A of the second embodiment except that the sky-hook control is not performed [referred to as "unsprung mass suspension control system" for the sake of convenience; (ii) in FIG. 17]; and a suspension control system that performs so-called passive suspension control [referred to as "passive suspension control system" for the sake of convenience; (i) in FIG. 17]. We obtained the results shown in FIG. 17.

The results of the measurement confirm that the suspension control system 1A of the second embodiment offers the following advantages. According to the suspension control system 1A, when the road surface condition is judged to be "rough road", the control gain Kd is increased, so that the time required for the sprung mass acceleration $\alpha u$ and the unsprung mass acceleration $\alpha d$ to converge becomes shorter than in the case of the passive suspension control system (i) or the sky-hook suspension control system (iii). Consequently, ride quality is improved. It is also confirmed that the unsprung mass suspension control system (ii) exhibits favorable control characteristics in the same way as the suspension control system of the second embodiment.

Figure 18:
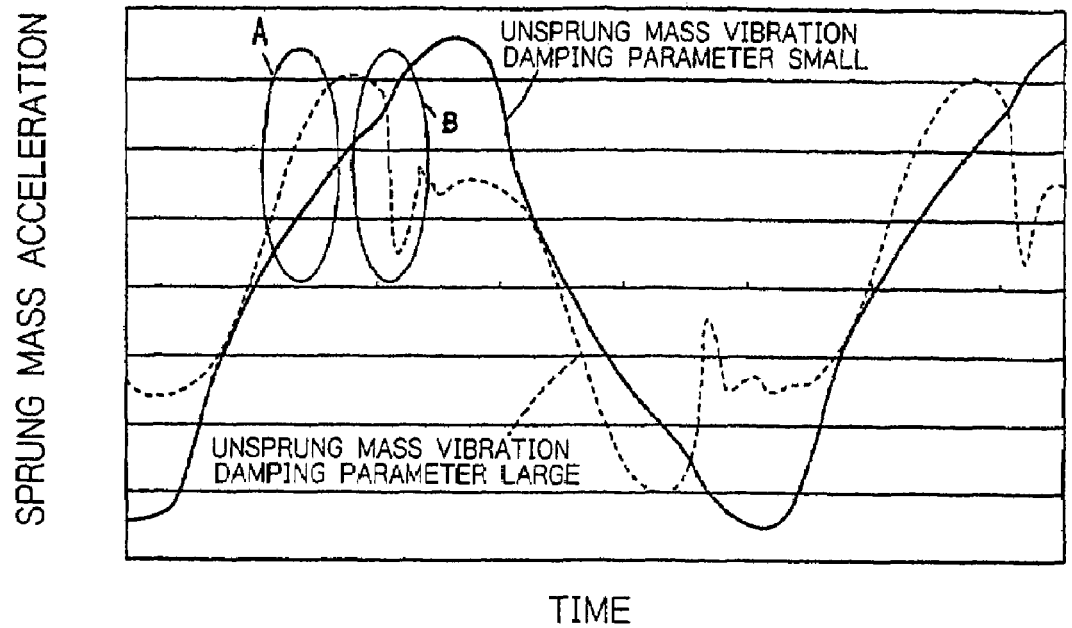
FIG. 18 is a waveform chart showing sprung mass accelerations measured for the suspension control system of FIG. 13 during running on an undulating road.
Figure 19:
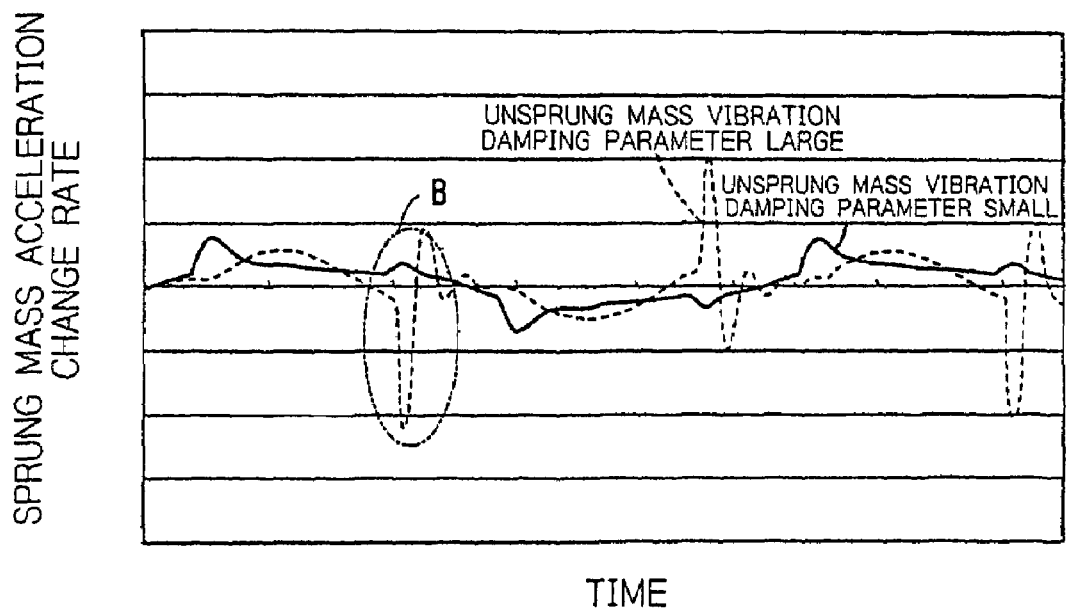
FIG. 19 is a waveform chart showing the rate of change of sprung mass acceleration measured for the suspension control system of FIG. 13 during running on an undulating road.

The suspension control system 1A of the second embodiment sets settings for undulating road at step S19 in FIG. 16 to adjust the control gain Kd (unsprung mass vibration damping parameter) to a small value, as stated above. The reason for this will be described below with reference to FIGS. 18 and 19. FIG. 18 shows the sprung mass acceleration $\alpha u$ during running on an undulating road when the unsprung mass vibration damping parameter is set to a large value (dotted-line curve) and when it is set to a small value (solid-line curve). FIG. 19 shows the sprung mass acceleration change rate $\alpha u'$ when the unsprung mass vibration damping parameter is set to a large value (dotted-line curve) and when it is set to a small value (solid-line curve).

When the vehicle begins to go up an undulation swell (part A in FIG. 18) after reaching the bottom of the preceding undulation swell, the vehicle body (sprung mass absolute velocity) changes its direction upward (part B in FIG. 18) with a slight delay with respect to the change in the road surface condition to reach the neighborhood of the minimum value (part B in FIG. 18). At this time, the unsprung mass acceleration $\alpha d$ (on the wheel 4 side) is in the neighborhood of the maximum value. The piston of the shock absorber 6 is in the compression stroke, and the piston speed is also in the neighborhood of the maximum value.

In the vicinity of part B in FIG. 18, when the unsprung mass vibration damping parameter is large, the value of the unsprung mass vibration damping control computing section 13B exerts a strong influence on the damping force control. Accordingly, because the unsprung mass acceleration $\alpha d$ (on the wheel 4 side) is high and the compression-side piston speed of the shock absorber 6 is also high, large damping force is generated.

As a result, the sprung mass acceleration $\alpha u$ is strongly suppressed in the region B in FIGS. 18 and 19. Consequently, the sprung mass acceleration change rate $\alpha u'$ changes to a considerable extent, and the change thereof assumes a large value. Such a condition of the sprung mass acceleration change rate $\alpha u'$ gives an uneasy feeling, making the vehicle occupants uncomfortable.

In the vicinity of part B in FIG. 18, when the unsprung mass vibration damping parameter is small, the value of the sky-hook control computing section 12 exerts a strong influence on the damping force control. At this time, the sprung mass absolute velocity changes its direction upward to reach the neighborhood of the minimum value. Therefore, small damping force is generated.

As a result, the sprung mass acceleration $\alpha u$ cannot be suppressed but increases in the region B in FIGS. 18 and 19. However, the sprung mass acceleration change rate $\alpha u'$ is small, and the change thereof is also small. Such a condition of the sprung mass acceleration change rate $\alpha u'$ gives a less uneasy feeling and makes the occupants less uncomfortable than in the case of the large unsprung mass vibration damping parameter.

Therefore, during running on an undulating road, the control gain Kd is set to a small value, whereas the control gain Ku related to the sprung mass is set to a large value.

As stated above, according to the second embodiment, the unsprung mass vibration damping parameter (control gain Kd) is adjusted according to the result of the road surface condition judgment, whereby it is possible to minimize uncomfortable feeling given to the occupants.

Next, a suspension control system 1B according to a third embodiment of the present invention will be described with reference to FIGS. 20 to 26.

Figure 20:
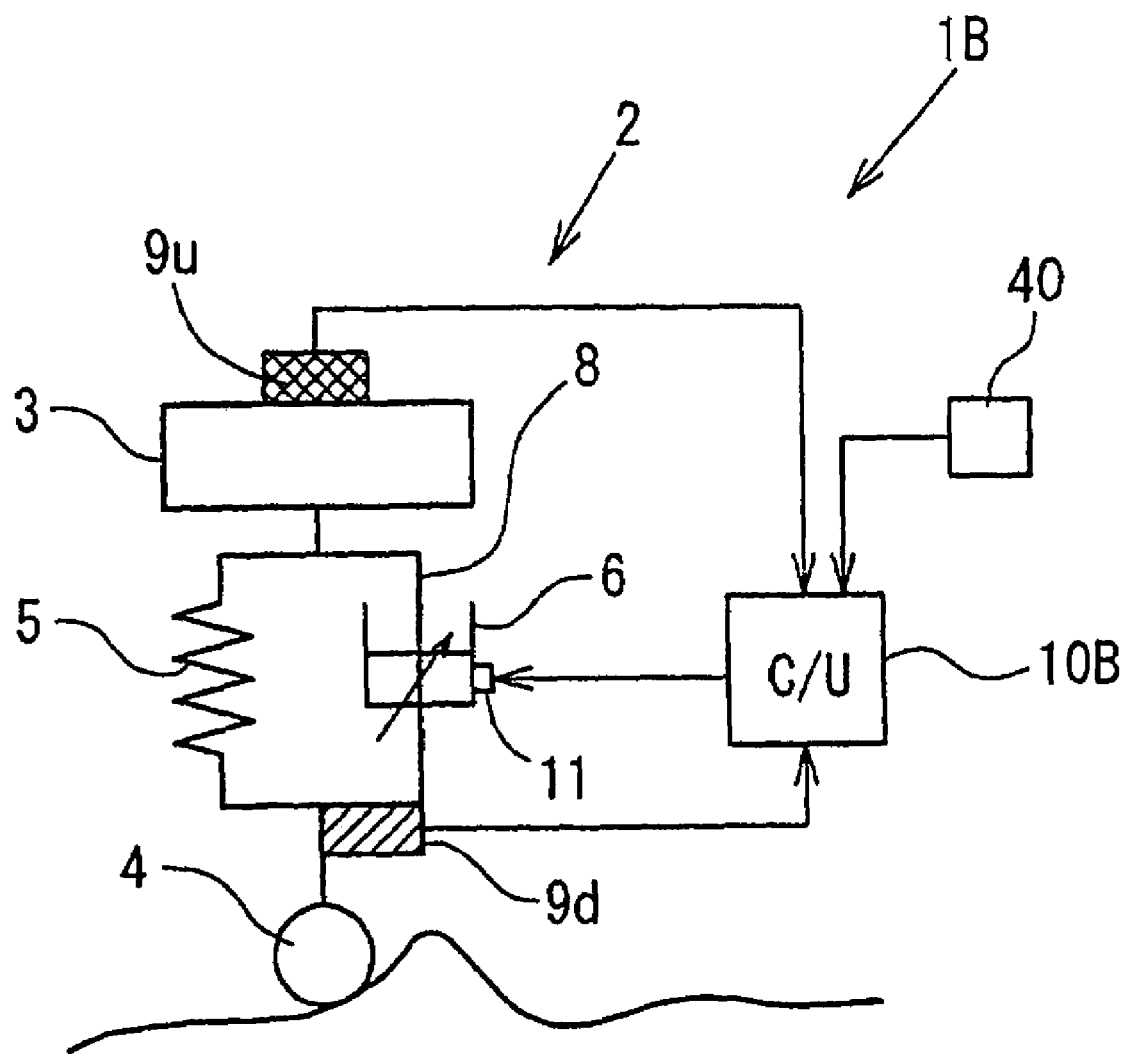
FIG. 20 is a diagram schematically showing a suspension control system according to a third embodiment of the present invention.
Figure 21:
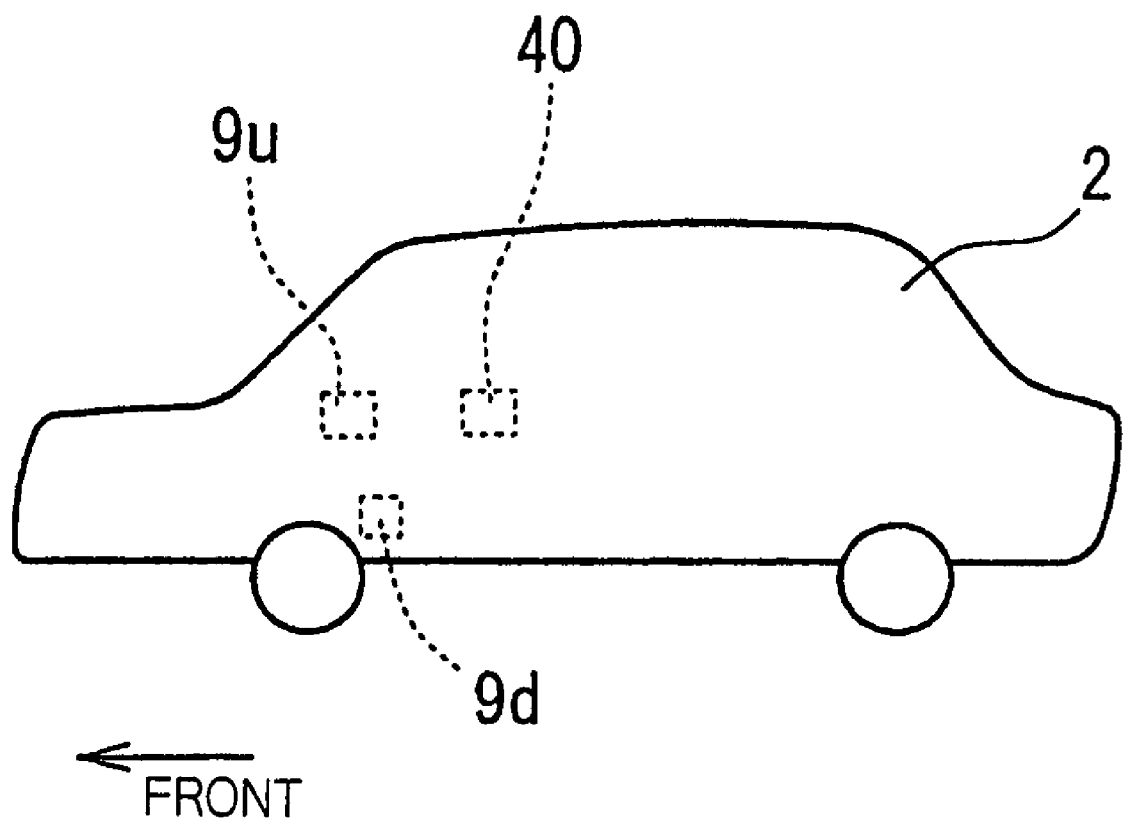
FIG. 21 is a side view schematically showing an automobile using the suspension control system shown in FIG. 20.

As shown in FIGS. 20 and 21, the suspension control system 1B has a vehicle speed sensor 40 for detecting the vehicle speed of an automobile 2 equipped with the suspension control system 1B. Detected vehicle speed data is input to a controller 10B. The controller 10B calculates a period of time elapsed from the time a front wheel has passed a point on the road surface until a rear wheel has passed the same point (expected transit time =wheelbase/vehicle speed) on the basis of the vehicle speed data and the wheelbase of the automobile 2. When the expected transit time has elapsed from the time the front wheel passed the point on the road surface, the controller 10B controls the shock absorber 6 for the rear wheel in accordance with the road surface condition at that point, thereby effecting favorable suspension control for the rear wheel and hence the whole automobile 2, and thus improving ride quality.

Figure 22:
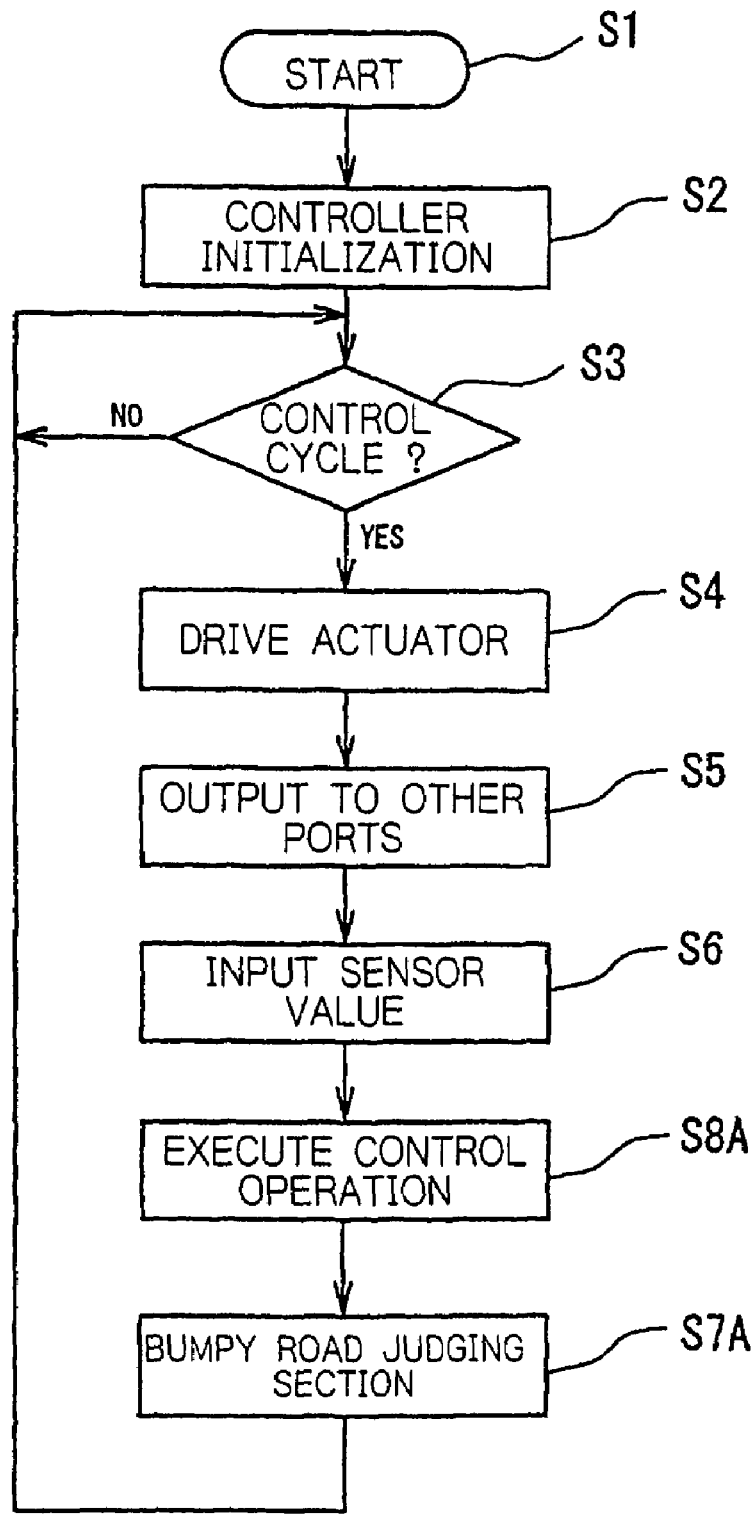
FIG. 22 is a flowchart (main routine) showing the contents of control executed by a controller shown in FIG. 20.

As shown in FIG. 22, the controller 10B is provided with a bumpy road judging step S7A in place of the road surface condition judging step S7 in FIG. 15 and further provided with a control operation executing step S8A in place of the control operation executing step S8 in FIG. 15.

Figure 23:
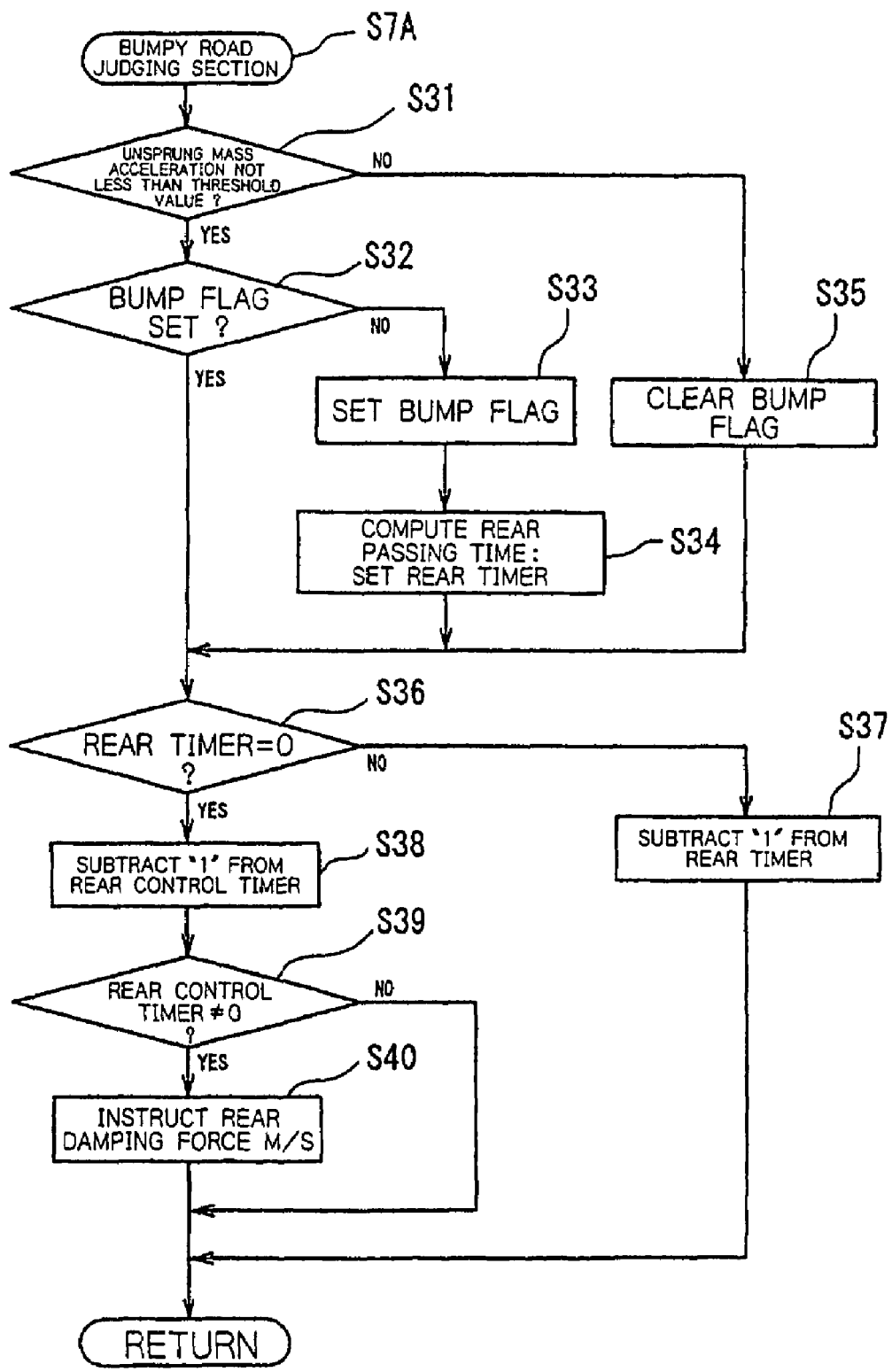
FIG. 23 is a flowchart showing the contents of processing executed by a bump judging section shown in FIG. 22.
Figure 24:
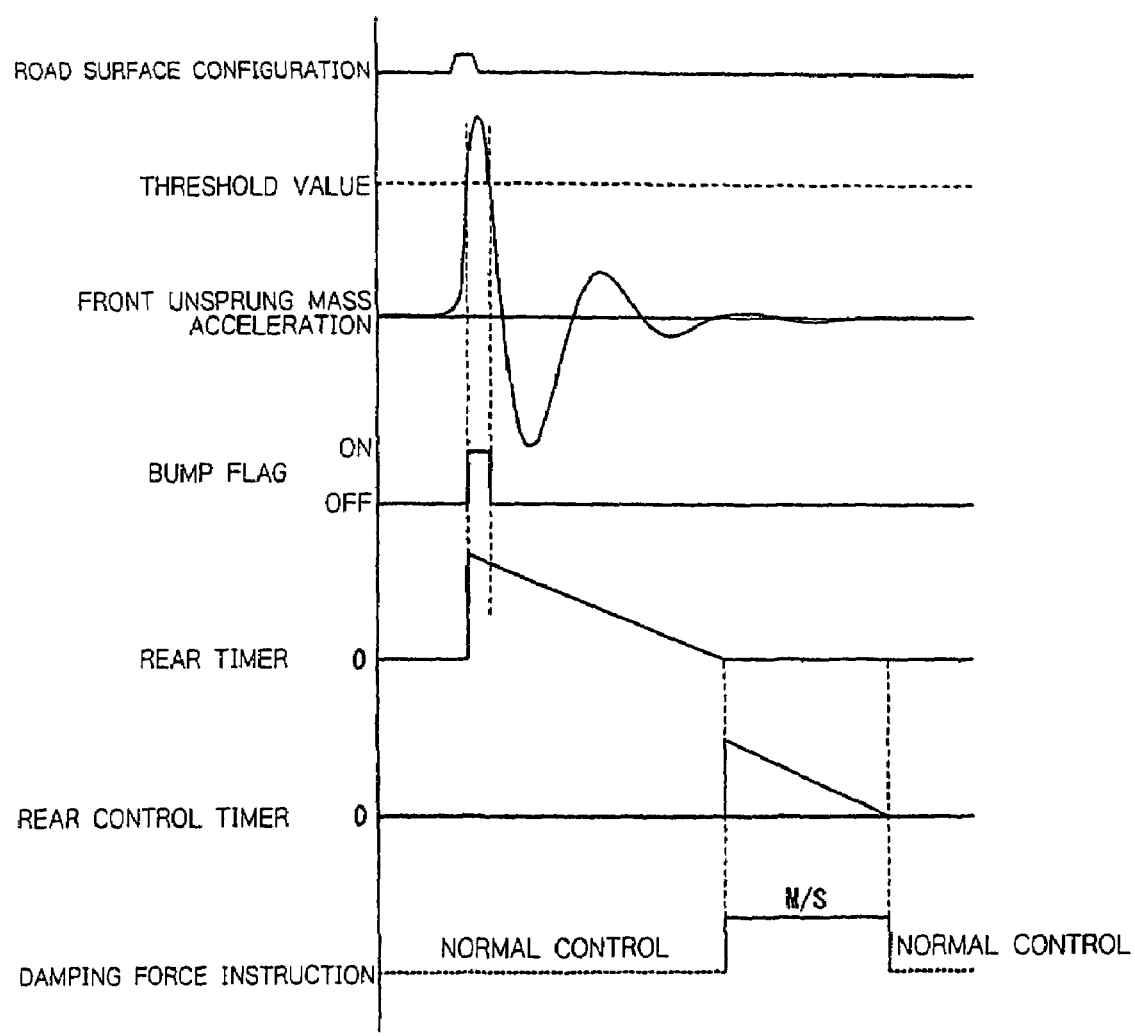
FIG. 24 is a waveform chart showing the timing of bump judgment made by the system shown in FIG. 20.
Figure 25:
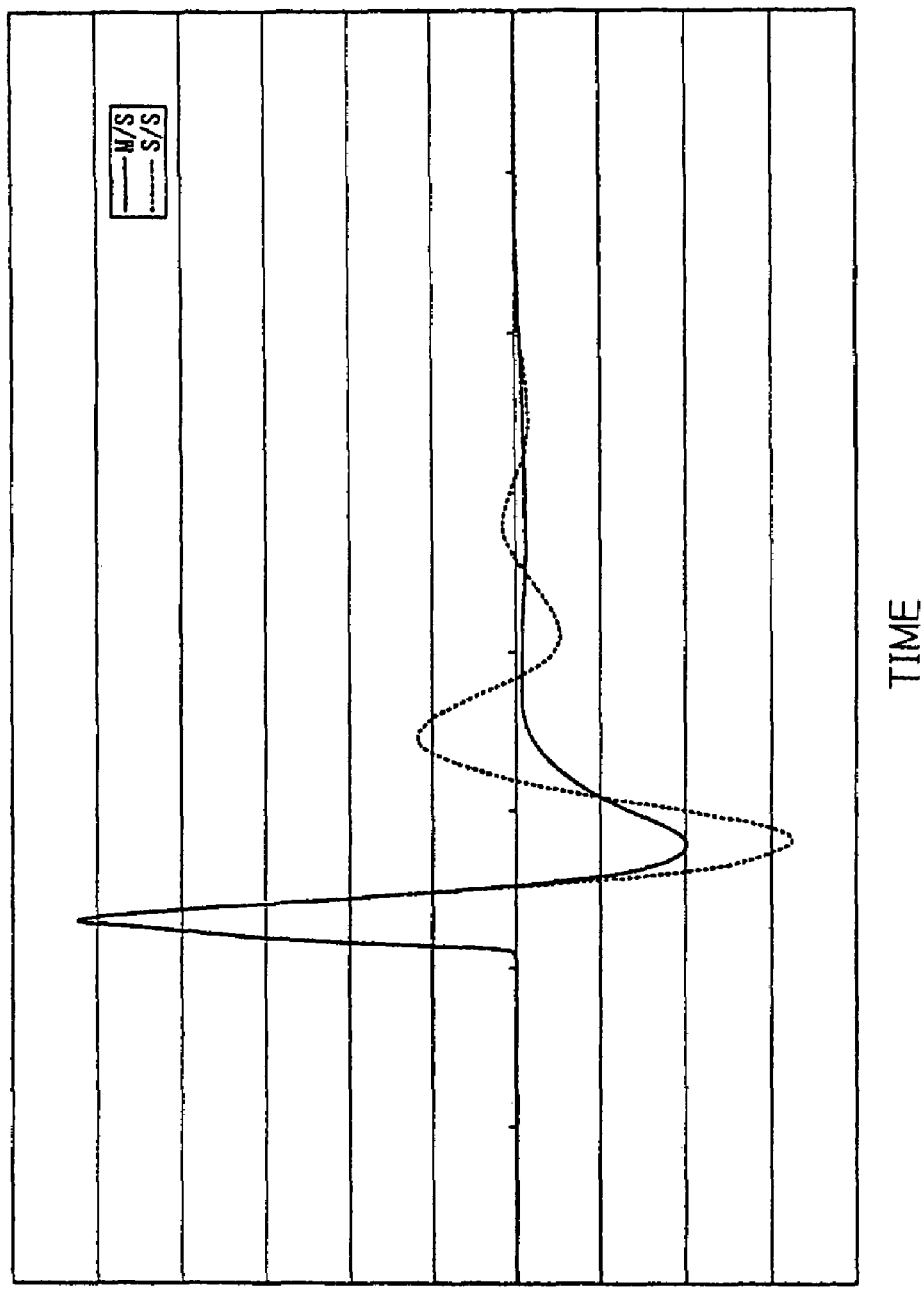
FIG. 25 is a waveform chart showing the convergence of sprung mass acceleration measured for each of M/S and S/S damping force characteristics set in the suspension control system of FIG. 20 during running over a bump.
Figure 26:
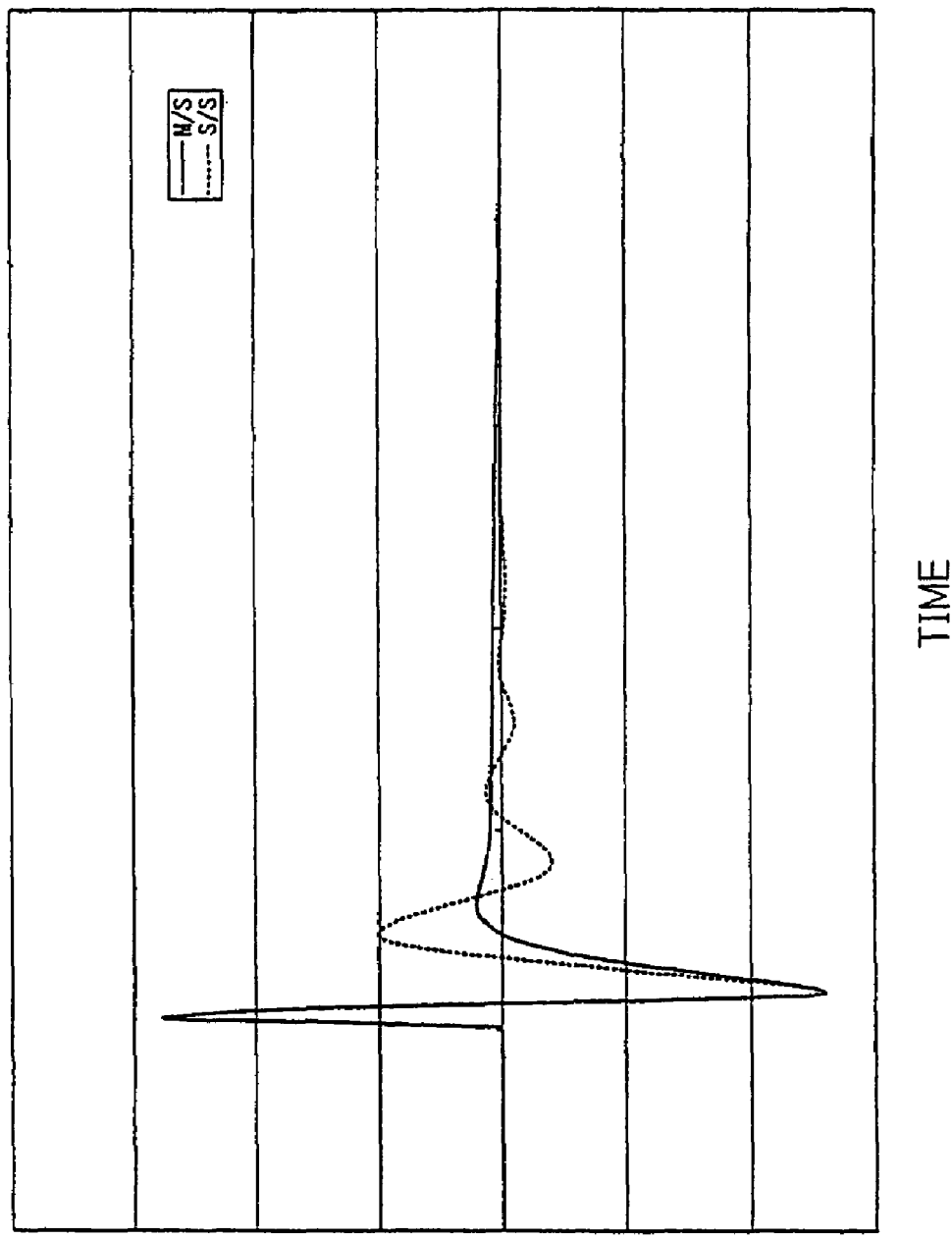
FIG. 26 is a waveform chart showing the convergence of unsprung mass acceleration measured for each of M/S and S/S damping force characteristics set in the suspension control system of FIG. 20 during running over a bump.

In the bumpy road judgment processing at step S7A, as shown in FIGS. 23 and 24, first, it is judged whether or not the unsprung mass acceleration $\alpha d$ is not less than a preset threshold value (step S31). If YES is the answer at step S31, then it is judged whether or not a bump flag has been set (step S32). If NO is the answer at step S32, then an expected transit time is calculated from the vehicle speed and the wheelbase (rear passing time computation is executed), and a bump flag is set (step S33). Then, a rear timer with a capacity corresponding to the expected transit time is set (step S34). If NO is the answer at the above-described step S31, the bump flag is cleared (step S35).

If YES is the answer at step S32, or upon completion of the processing at step S34 or S35, it is judged whether or not the value of the rear timer is zero (step S36). If NO is the answer at step S36 (i.e. the time elapsed from the time the front wheel passed the bump has not yet reached the expected transit time), "1" is subtracted from the value of the rear timer (step S37), and the process returns to the main routine (FIG. 22). Then, the above-described processing (steps S1 to S37) is executed until the expected transit time has elapsed.

If YES is the answer at step S36 (i.e. the time elapsed from the time the front wheel passed the bump has reached the expected transit time), "1" is subtracted from a rear control timer (step S38), and it is judged whether or not the value of the rear control timer is not zero (step S39). If YES is the answer at step S39 (i.e. the value of the rear control timer is not zero), a control signal A is-output to the actuator 11 (step S40) so that the rear wheel-side shock absorber 6 generates damping force (rear damping force) providing "middle" (M) damping force for the extension stroke, and "soft" (S) damping force for the compression stroke (i.e. M/S damping force characteristics). It should be noted that the "middle" (M) damping force has a magnitude between "hard" (H) and "soft" (S). Then, the process returns to the main routine. If NO is the answer at step S39 (i.e. the value of the rear control timer is zero), the process does not proceed to step S40 but returns to the main routine.

With the above-described processing executed by the controller 10B, when the front wheel passes a bump on the road surface, control for minimizing vibrations that will be caused by the bump is executed with respect to the rear wheel-side shock absorber 6 for a period of time corresponding to the set value on the rear control timer after the expected transit time (value of the rear timer) has elapsed from the time the front wheel passed the bump.

Accordingly, favorable suspension control can be performed accurately for the rear wheel side and hence the whole automobile 2 in conformity to the road surface condition of a road on which the automobile 2 is running. Thus, ride quality can be improved.

In the third embodiment, when the automobile 2 runs over a bump, the rear wheel-side shock absorber 6 is controlled to generate M/S damping force as stated above. In this regard, the present inventors measured the sprung mass acceleration $\alpha u$ and the unsprung mass acceleration $\alpha d$ for each of two damping force characteristics: M/S damping force characteristics as in the third embodiment; and S/S damping force characteristics (i.e. the rear wheel-side shock absorber 6 is controlled to generate S/S damping force during running over a bump), and obtained the results shown in FIGS. 25 and 26, respectively. As shown in these figures, the third embodiment (in which M/S damping force is generated) enables the vibration convergence time to be shortened to a considerable extent in comparison to the case where S/S damping force is generated. Thus, it has been confirmed that favorable suspension control can be effected by the third embodiment.

In the first and second embodiments, one or two combinations of sprung and unsprung mass acceleration sensors $9u$ and $9d$ are provided for the front wheel side, and at least one combination of sprung and unsprung mass acceleration sensors $9u$ and $9d$ is provided for the rear wheel side. In this regard, the third embodiment controls the rear wheel-side shock absorber 6 on the basis of detected signals from the sprung and unsprung mass acceleration sensors $9u$ and $9d$ provided for the front wheel side. Accordingly, sprung and unsprung mass acceleration sensors $9u$ and $9d$ are provided for only the front wheel side, and none of them are provided for the rear wheel side. Therefore, the system can be simplified to an extent corresponding to the omission of the sprung and unsprung mass acceleration sensors $9u$ and $9d$ from the rear wheel side.

Next, a suspension control system 1C according to a fourth embodiment of the present invention will be described with reference to FIGS. 27 to 33.

In general, the control effect of a suspension control system changes when the unsprung weight changes owing to replacement of a tire or a wheel, for example. The suspension control system 1C of the fourth embodiment estimates the unsprung mass resonance frequency from the unsprung mass acceleration $\alpha d$, and calculates the unsprung weight from the unsprung mass resonance frequency and the spring constant of the spring 5 (the unsprung mass resonance frequency has a predetermined relationship with the unsprung weight and the spring constant such that the unsprung mass resonance frequency lowers with the increase of the unsprung weight and increases with the increase of the spring constant), thereby obtaining favorable control effect even when the unsprung weight changes.

Figure 27:
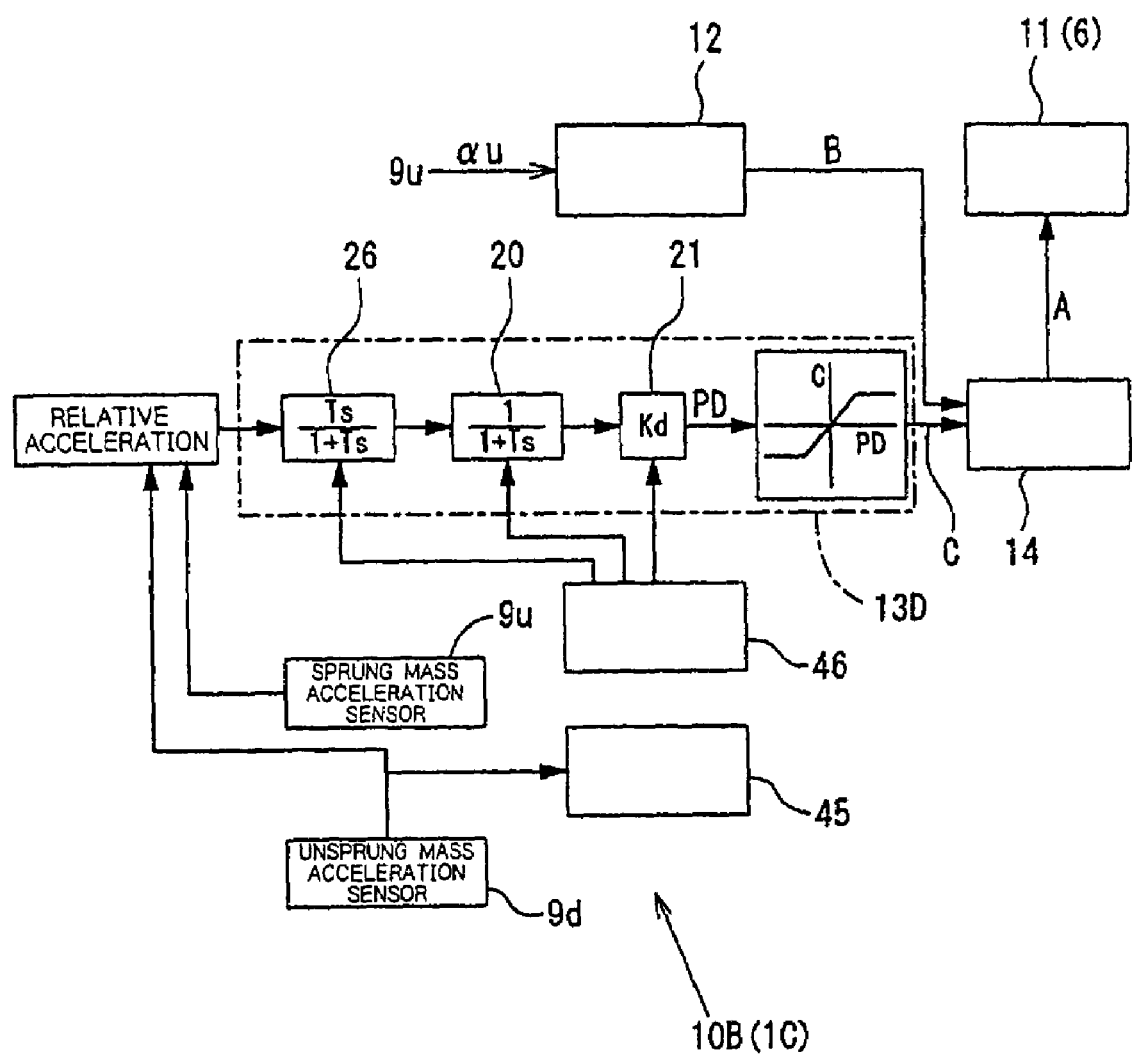
FIG. 27 is a block diagram showing a controller of a suspension control system according to a fourth embodiment of the present invention.

As shown in FIG. 27, the controller 10B of the suspension control system 1C according to the fourth embodiment has an unsprung weight calculating section 45 that estimates the unsprung mass resonance frequency from the unsprung mass acceleration $\alpha d$ and calculates the unsprung weight from the unsprung mass resonance frequency and the spring constant of the spring 5 (the unsprung mass resonance frequency has a predetermined relationship with the unsprung weight and the spring constant such that the unsprung mass resonance frequency lowers with the increase of the unsprung weight and increases with the increase of the spring constant). The controller 10B further has a parameter adjusting section 46 that adjusts the cut-off frequencies of the low-pass filter 20 and the high-pass filter 26 and the control gain Kd according to the unsprung weight.

The method of estimating the unsprung mass resonance frequency may, for example, be as follows. The unsprung mass resonance frequency is estimated by frequency-analyzing the unsprung mass acceleration using a microcomputer. Alternatively, the peak-to-peak time of the waveform of the unsprung mass acceleration is measured to thereby estimate the unsprung mass resonance frequency. Instead of estimating the unsprung mass resonance frequency, the user or a mechanic at a service station may input the unsprung mass resonance frequency and the unsprung weight specific to the vehicle concerned through a controller.

Figure 28:
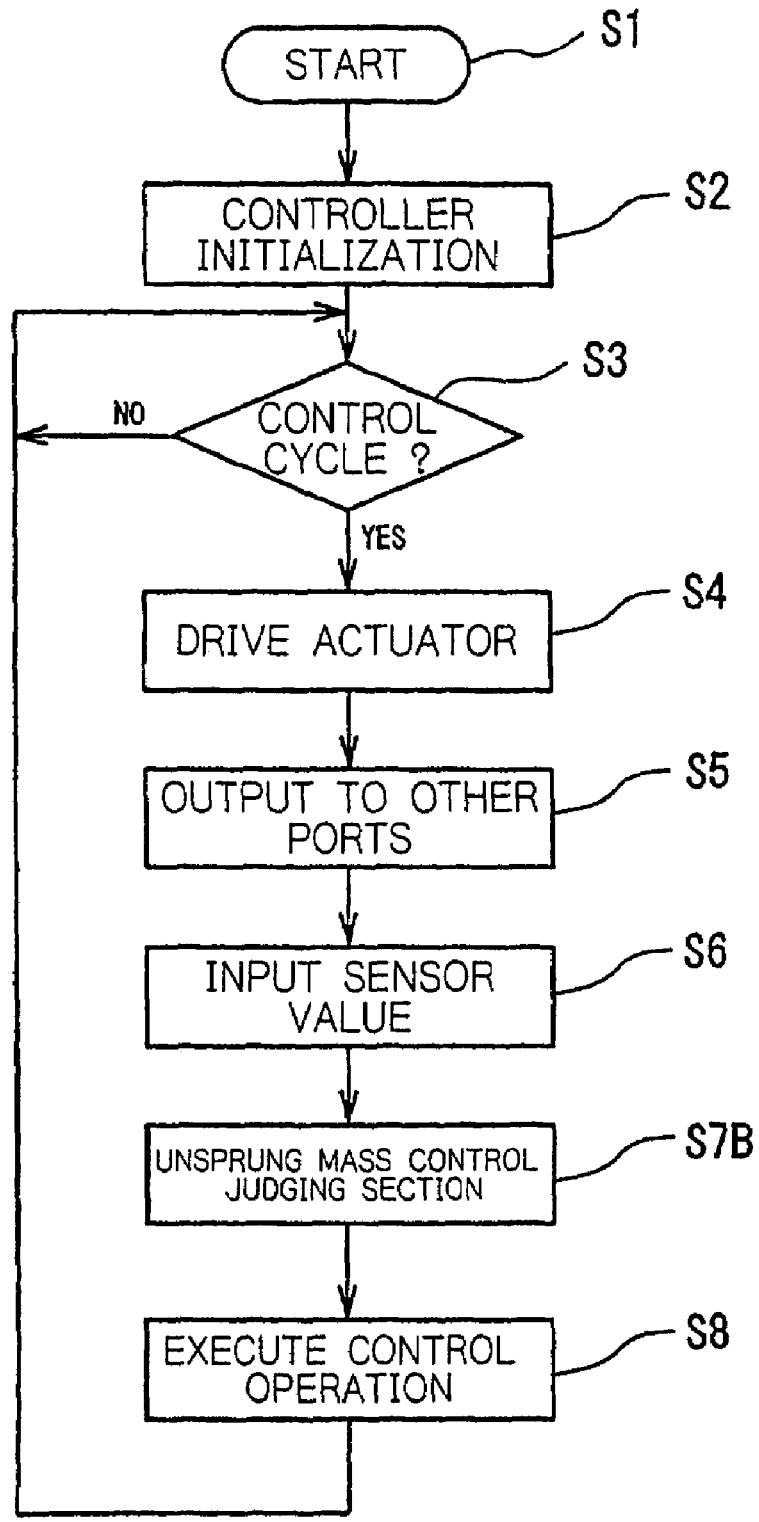
FIG. 28 is a flowchart (main routine) showing the contents of control executed by the controller shown in FIG. 27.

As shown in FIG. 28, the controller 10B is provided with an unsprung mass vibration damping judging step (step S7B) in place of the road surface condition judging section 30 shown in FIG. 15.

Figure 29:
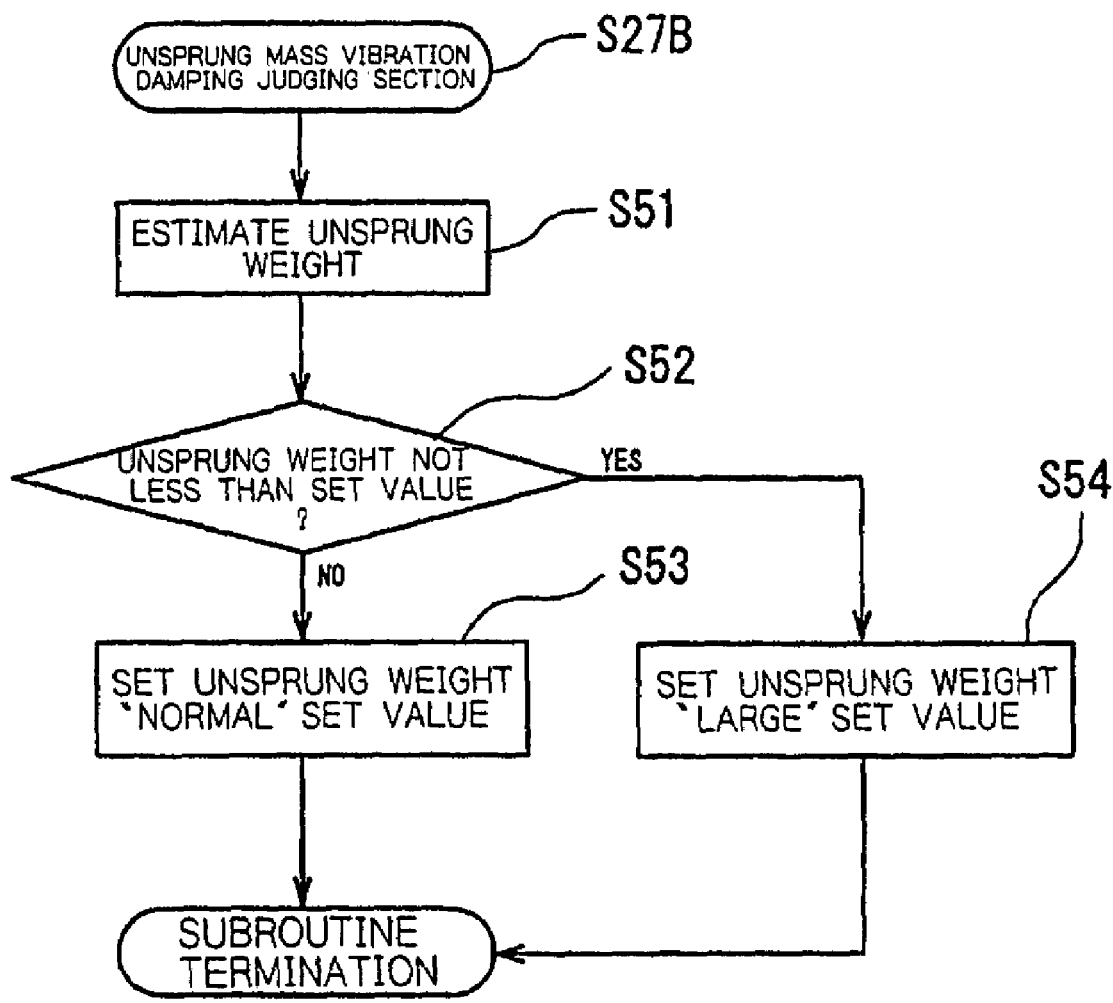
FIG. 29 is a flowchart showing the contents of processing executed by an unsprung mass vibration damping judging section shown in FIG. 28.

As shown in FIG. 29, at the unsprung mass vibration damping judging step S7B, first, the unsprung weight is estimated (step S51). Subsequently, it is judged whether or not the unsprung weight is not less than a preset value (step S52). If NO is the answer at step S52 (i.e. the unsprung weight is less than the set value), an unsprung weight "normal" set value is set (step S53), and the subroutine is terminated.

Figure 30:
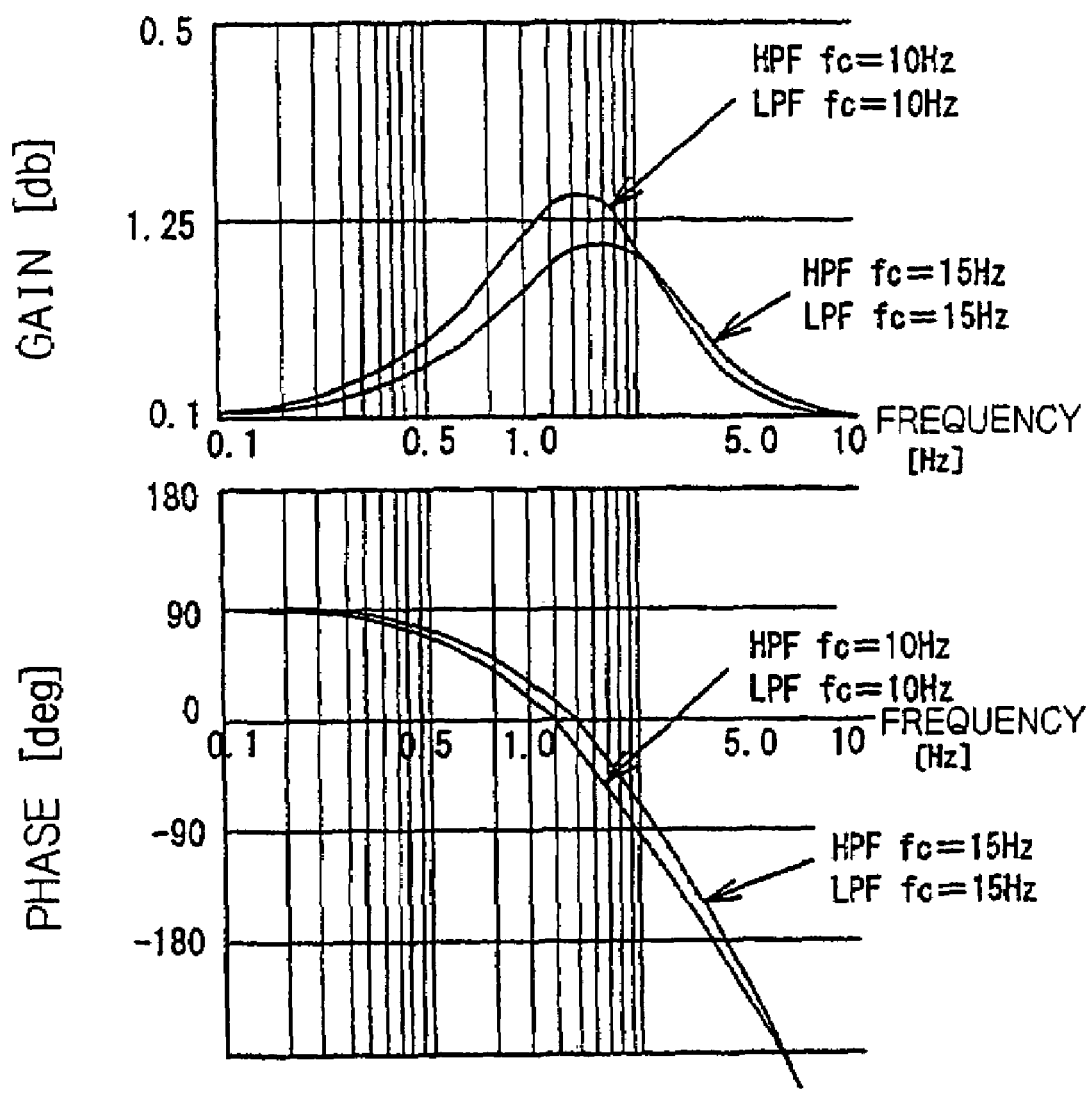
FIG. 30 is a waveform chart showing phase characteristics and gains corresponding to two different cut-off frequencies that are to be used in a low-pass filter, a high-pass filter, and an amplifier circuit shown in FIG. 27.

At step S53, phase characteristics and gain Kd (control parameters) for a cut-off frequency fc of 15 Hz are used, as shown in FIG. 30, for each of the low-pass filter 20, the high-pass filter 26 and the amplifier circuit 21 in accordance with the unsprung weight "normal" set value.

If YES is the answer at step S52 (i.e. the unsprung weight is not less than the set value), an unsprung weight "large" set value is set (step S54), and the subroutine is terminated.

At step S54, phase characteristics and gain Kd (control parameters) for a cut-off frequency fc of 10 Hz are used, as shown in FIG. 30, for each of the low-pass filter 20, the high-pass filter 26 and the amplifier circuit 21 in accordance with the unsprung weight "large" set value.

Figure 31:
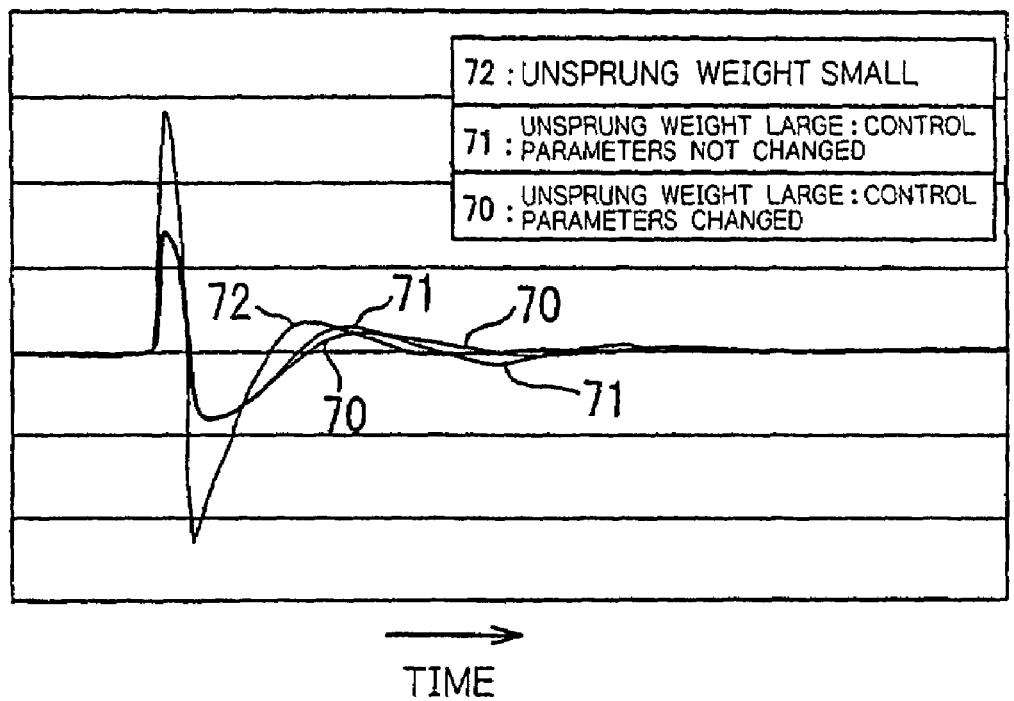
FIG. 31 is a diagram showing unsprung mass accelerations measured for the suspension control system of FIG. 27 and examples for comparison therewith.

The present inventors measured the unsprung mass acceleration αd when the automobile 2 equipped with the suspension control system 1C of the fourth embodiment ran over a bump, and obtained the results shown in FIG. 31.

That is, the results shown by the waveform 70 in FIG. 31 were obtained when the unsprung weight was large by generating damping force as stated above, i.e. by setting the unsprung weight "large" set value and using the phase characteristics and gain Kd for a cut-off frequency fc of 10 Hz corresponding to the set value.

For comparison to the above, the unsprung mass acceleration αd was measured for a case where the unsprung weight "normal" set value was set when the unsprung weight was large, and for a case where the unsprung weight was small. As a result, waveforms 71 and 72 were obtained for the two comparative examples, respectively.

The waveform chart of FIG. 31 reveals the following. According to the suspension control system 1C of the fourth embodiment, the unsprung weight "large" set value is set when the unsprung weight is large. By doing so, the convergence of the unsprung mass acceleration αd is improved in comparison to the case where the unsprung weight "large" set value is not set (i.e. the unsprung weight "normal" set value is set), and tire's road holding capability improves correspondingly.

Figure 32:
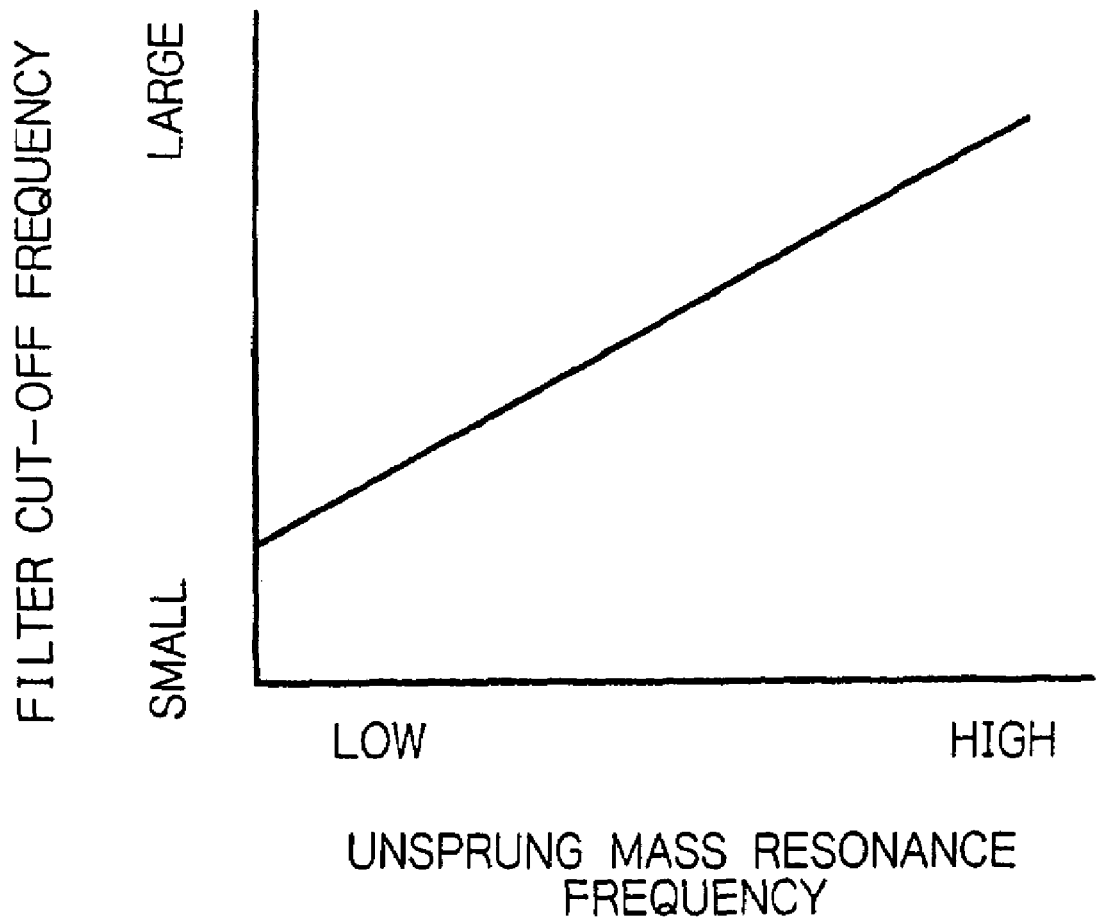
FIG. 32 is a diagram showing an example of cut-off frequency adjustment different from that in the controller shown in FIG. 27.
Figure 33:
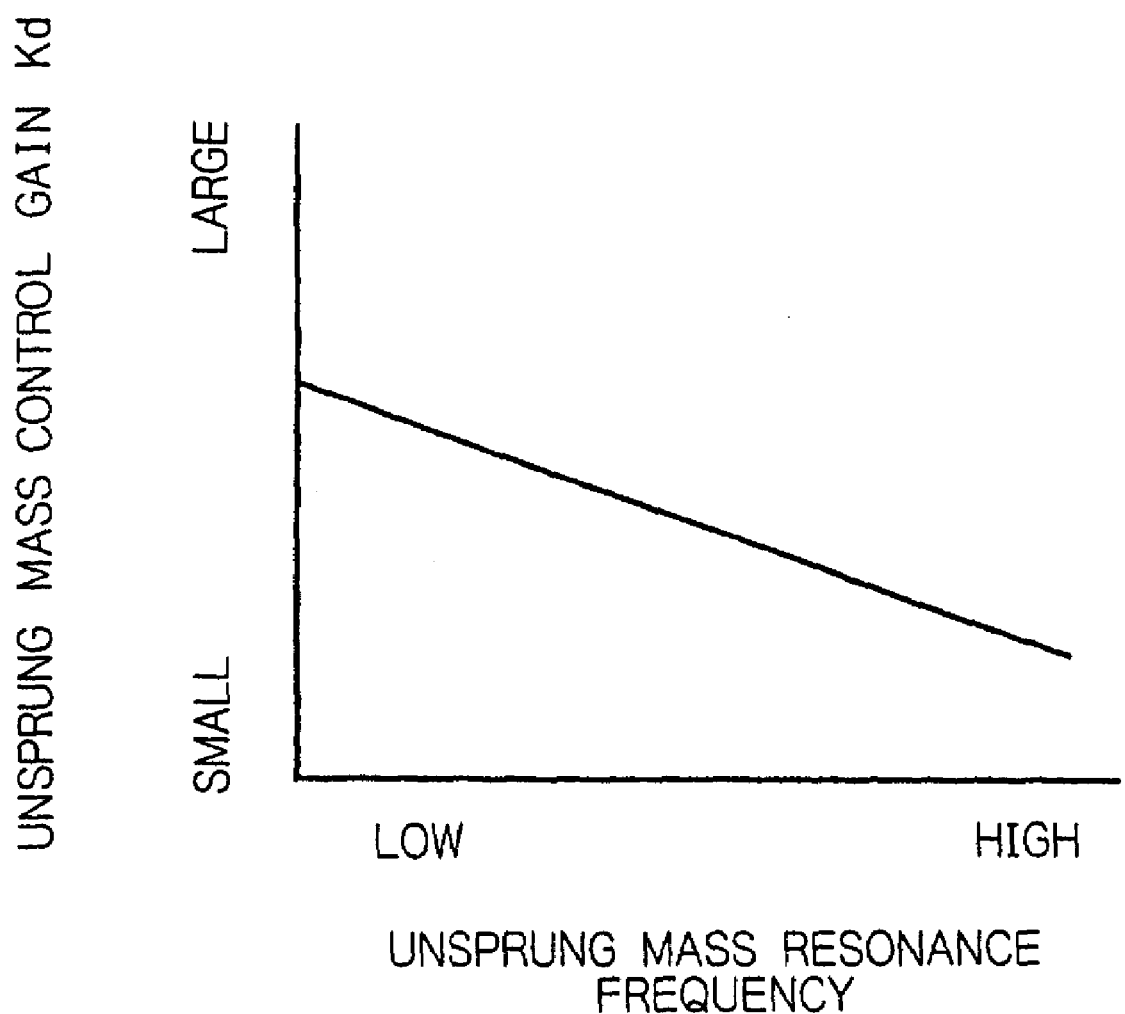
FIG. 33 is a diagram showing an example of gain adjustment different from that in the controller shown in FIG. 27.

Although in this embodiment the parameters are switched between two levels according to the change of the unsprung mass resonance frequency, it should be noted that the present invention is not necessarily limited thereto. For example, the cut-off frequency of the filters (low-pass filter 20 and high-pass filter 26) and the unsprung mass control gain Kd may be changed continuously as shown in FIGS. 32 and 33.

What is claimed is:

1. A suspension control system comprising:
   a damping characteristic controllable shock absorber provided between a sprung mass member and an unsprung mass member of a vehicle, said shock absorber being arranged such that damping characteristics are adjustable between "soft" and "hard" damping characteristics;
   a sprung mass vertical acceleration detecting device that detects a vertical acceleration of the sprung mass member and outputs a sprung mass vertical acceleration signal;
   an unsprung mass vertical acceleration detecting device that detects a vertical acceleration of the unsprung mass member and outputs an unsprung mass vertical acceleration signal, said unsprung mass vertical acceleration detecting device being provided on the unsprung mass member; and
   a controller that outputs a control signal for controlling said damping characteristic-controllable shock absorber from said sprung mass vertical acceleration signal and said unsprung mass vertical acceleration signal;
   wherein said controller comprises:
   a sprung mass vibration damping signal computing section that computes a sprung mass vibration damping signal on the basis of said sprung mass vertical acceleration signal;
   an unsprung mass vibration damping signal computing section that computes an unsprung mass vibration damping signal on the basis of said unsprung mass vertical acceleration signal; and
   a desired damping characteristic control signal computing section that computes said control signal on the basis of said sprung mass vibration damping signal and said unsprung mass vibration damping signal, and
   wherein said unsprung mass vibration damping signal computing section computes said unsprung mass vibration damping signal so that said unsprung mass vibration damping signal leads in phase a vertical velocity of the unsprung mass member.

2. A suspension control system according to claim 1, wherein said unsprung mass vibration damping signal computing section obtains a relative acceleration from said unsprung mass vertical acceleration signal and said sprung mass vertical acceleration signal, and computes an unsprung mass vibration damping signal from said relative acceleration.

3. A suspension control system according to claim 1, wherein said unsprung mass vibration damping signal computing section has a filter that filters said unsprung mass vertical acceleration signal to pass a signal in the neighborhood of an unsprung mass resonance frequency.

4. A suspension control system according to claim 3, wherein said filter has an adjustable cut-off frequency.

5. A suspension control system according to claim 4, wherein said controller further comprises a frequency adjusting section that adjusts said cut-off frequency according to a result of detection by said unsprung mass vertical acceleration detecting device.

6. A suspension control system according to claim 1, wherein said unsprung mass vibration damping signal computing section has a phase adjusting element that adjusts a phase of a signal.

7. A suspension control system according to claim 1, wherein said sprung mass vibration damping signal computing section integrates said sprung mass vertical acceleration signal to obtain a signal proportional to an absolute velocity of the sprung mass member.

8. A suspension control system according to claim 1, wherein said desired damping characteristic control signal computing section computes said control signal by adding together the sprung mass vibration damping signal and the unsprung mass vibration damping signal.

9. A suspension control system according to claim 1, wherein said desired damping characteristic control signal computing section computes said control signal by selectively outputting either one of the sprung and unsprung mass vibration damping signals.

10. A suspension control system according to claim 1, wherein said controller is provided with a road surface condition judging device to correct the unsprung mass vibration damping signal according to a result of judgment by said road surface condition judging device.

11. A suspension control system according to claim 10, wherein the judgment by said road surface condition judging device is made on the basis of a detected signal detected by a sprung mass vertical acceleration detecting device provided for a front wheel side of the vehicle.

12. A suspension control system according to claim 11, wherein damping characteristics of a damping characteristic inverting type shock absorber provided for a rear wheel side of the vehicle are varied according to a detected signal detected by an unsprung mass vertical acceleration detecting device provided for said front wheel side.

13. A suspension control system according to claim 1, wherein the unsprung mass vibration damping signal is obtained by multiplying said unsprung mass vertical acceleration signal by a control gain, said control gain being adjustable.

14. A suspension control system according to claim 13, wherein said controller further comprises a gain adjusting section that adjusts said control gain according to a result of detection by said unsprung mass vertical acceleration detecting device.

* * * * *